(12) United States Patent
Andreasen et al.

(10) Patent No.: US 8,046,297 B2
(45) Date of Patent: *Oct. 25, 2011

(54) USER INTERFACE, SYSTEM AND METHOD FOR PERFORMING A WEB-BASED TRANSACTION

(75) Inventors: Stefan Andreasen, Espergaerde (DK); Morten Helles, Gentofte (DK)

(73) Assignee: Kapow ApS (DK)

( * ) Notice: Subject to any disclaimer, the term of this patent is extended or adjusted under 35 U.S.C. 154(b) by 0 days.

This patent is subject to a terminal disclaimer.

(21) Appl. No.: 12/987,371

(22) Filed: Jan. 10, 2011

(65) Prior Publication Data

US 2011/0112928 A1    May 12, 2011

Related U.S. Application Data

(63) Continuation of application No. 10/203,830, filed as application No. PCT/DK00/00429 on Aug. 1, 2000, now Pat. No. 7,904,369.

(30) Foreign Application Priority Data

| Feb. 11, 2000 | (DK) | ................................ 2000 00222 |
| Mar. 31, 2000 | (WO) | ..................... PCT/DK00/00163 |
| Apr. 14, 2000 | (DK) | ................................ 2000 00638 |

(51) Int. Cl.
    *G06Q 40/00* (2006.01)
    *G06Q 30/00* (2006.01)
    *G06F 7/00* (2006.01)
    *G06F 17/30* (2006.01)

(52) U.S. Cl. .......... 705/37; 707/706; 707/707; 705/26.1

(58) Field of Classification Search .................... 705/26, 705/37; 707/707, 706
See application file for complete search history.

(56) References Cited

U.S. PATENT DOCUMENTS

| 5,745,681 | A | 4/1998 | Levine et al. |
| 5,926,798 | A | 7/1999 | Carter |
| 6,052,669 | A | 4/2000 | Smith et al. |
| 6,397,212 | B1 | 5/2002 | Biffar |
| 6,421,675 | B1 | 7/2002 | Ryan et al. |

FOREIGN PATENT DOCUMENTS

GB    2289598    3/1995

(Continued)

OTHER PUBLICATIONS

Acses.com, Dec. 5, 1998.

(Continued)

*Primary Examiner* — Kirsten Apple
*Assistant Examiner* — Scott Trotter
(74) *Attorney, Agent, or Firm* — Cantor Colburn LLP

(57) ABSTRACT

Disclosed is a computer with a user interface, the computer including central processing units, memories, and network interfaces, a program code that performs a search and transaction based on user input, the interface displaying in conjunction with code execution, an input environment adapted to search criteria input, the criteria defining a search for desired entities, the program code establishing a search engine that searches on different web sources to generate a search result, the engine searching using a combination of different input entities, a first entity and a second entity includable in the different entities, the engine searching for the configuration, the different entities being purchasable from different web sources, the engine searching on different web sources for the combination, and presenting found configurations, the engine providing at least one order input determined by at least one found configuration, the system taking mutual dependencies between the entities into consideration.

19 Claims, 20 Drawing Sheets

FOREIGN PATENT DOCUMENTS

GB 2328530 8/1997

OTHER PUBLICATIONS

Figure 1:
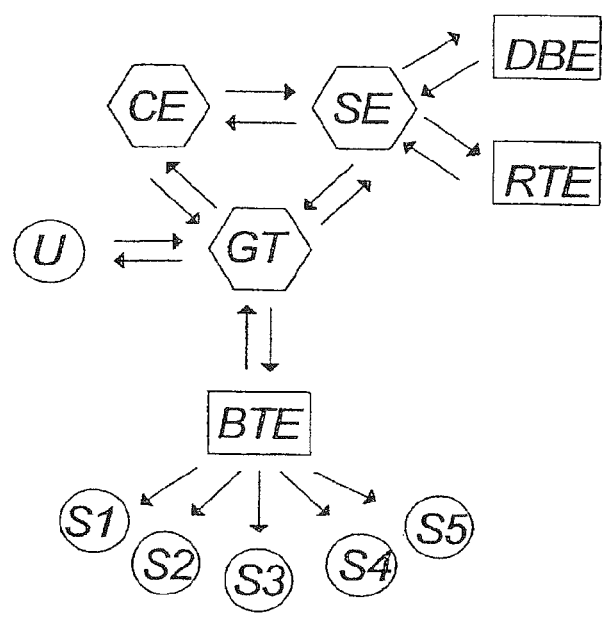

Bruno Giussani, Sep. 22, 1998, Chicago Tribune, Your Money, p. 3.

Jonathan Gaw, Dec. 21, 1998, Los Angeles Times, Business, Part C, p. 6.

Phyllis Smith, Nov. 1, 1998, Online, No. 6, vol. 22, p. 46, ISSN: 0146-5422.

Katherine T. Beddingfield et al., Best of the Web, U.S. News & World Report, pp. 46, 48.

QuickenMortgage, One of the . . . , Nov. 5, 1998, PR Newswire, Financial News.

Bibliofind.com, Jan. 29, 1999.

Byron Rohrig, Leasing or Buying? Auto Dealers report more drivers opting for former, but latter may be wiser, Mar. 21, 1999, Evansville Courier & Press, p. E1.

PCT/DK/00/00429 International Examination Report, Jul. 15, 2002.

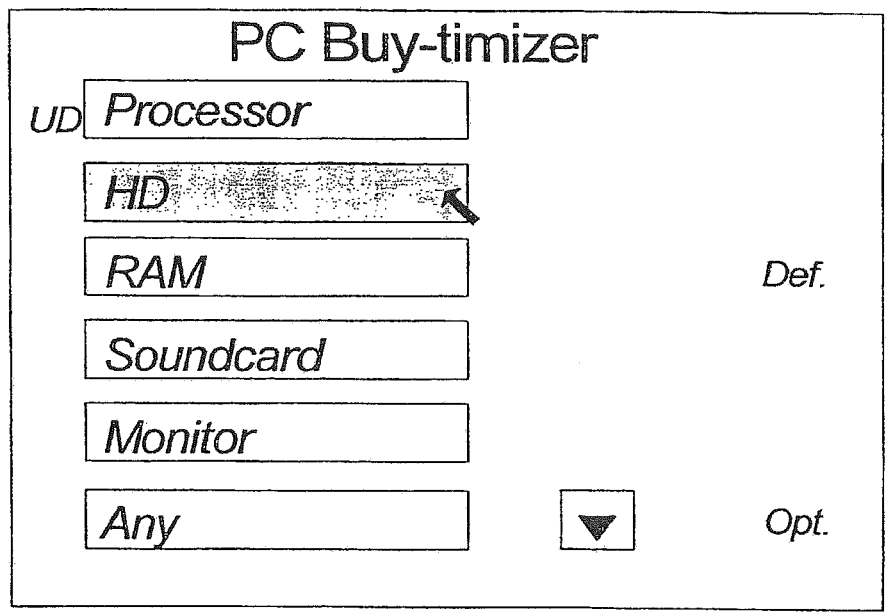

Components

Processor

| | |
|---|---|
| Speed | 1000 MHz ▼ |
| Min price | Any ▼ |
| Max price | ▼ |

HD

| | |
|---|---|
| Memory | 20 Gbyte ▼ |
| Min price | Any ▼ |
| Max price | ▼ |

RAM

| | |
|---|---|
| Memory | 128 MHz ▼ |
| Access time | ▼ |
| Min price | Any ▼ |
| Max price | ▼ |

Soundcard

| | |
|---|---|
| Min price | Any ▼ |
| Max price | ▼ |

Monitor

| | |
|---|---|
| Size | Any ▼ |
| Min price | Any ▼ |
| Max price | ▼ |

Monitor furniture

| | |
|---|---|
| Color | White ▼ |
| New/2nd hand | 2nd hand ▼ |
| Min price | Any ▼ |
| Max price | ▼ |

Search Components

Configuration

| | |
|---|---|
| Min price | Any ▼ |
| Max price | 1500 $ ▼ |

Search Configuration

*Fig. 15*

Matching configurations

| Put into shopping card | 1 | 2 | 3 |
|---|---|---|---|
| Manufacturer | Not-so-good | Crap | The best |
| Processor | 1000 MHz | 1000 MHz | 1000 MHz |
| RAM | 128 Mbyte | 128 Mbyte | 128 Mbyte |
| HD | 20 Gbyte | 26.1 Gbyte | 20 Gbyte |
| Soundcard | Glurp | T-ear | Buy-me |
| Monitor | 17' | 15' | 17' |
| Monitor furniture | 125 $ | 125 $ | 125 $ |
| Configured price | 1499 $ | 1199 $ | 1399 $ |

Re-configure price | Insert new values

*Fig. 16A*

Shopping card

| Manufacturer | The best |
|---|---|
| Processor | 1000 MHz |
| RAM | 128 Mbyte |
| HD | 20 Gbyte |
| Soundcard | Buy-me |
| Monitor | 17' |
| Monitor furniture | 125 $ |

1399 $

Payment and delivery conditions

*Fig. 16B*

Matching configurations

| Put into shopping card | 1 | 2 | 3 |
|---|---|---|---|
| Manufacturer | Not-so-good | Crap | The best |
| Processor | 1000 MHz | 1000 MHz | 1000 MHz |
| RAM | 128 Mbyte | 128 Mbyte | 128 Mbyte |
| HD | 20 Gbyte | 26.1 Gbyte | 20 Gbyte |
| Soundcard | Glurp | T-ear | Buy-me |
| Monitor | 17' | 15' | 17' |
| Monitor furniture | 125 $ | 125 $ | 125 $ |
| Configured price | 1499 $ | 1199 $ | 1399 $ |

Re-configure price    Insert new values

*Fig. 17A*

Shopping card

| Manufacturer | The best |
|---|---|
| Processor | 1000 MHz |
| RAM | 128 Mbyte |
| HD | 20 Gbyte |
| Soundcard | Buy-me |
| Monitor | 17' |
| Monitor furniture | 125 $ |
| | 1399 $ |

Payment and delivery conditions

*Fig. 17B*

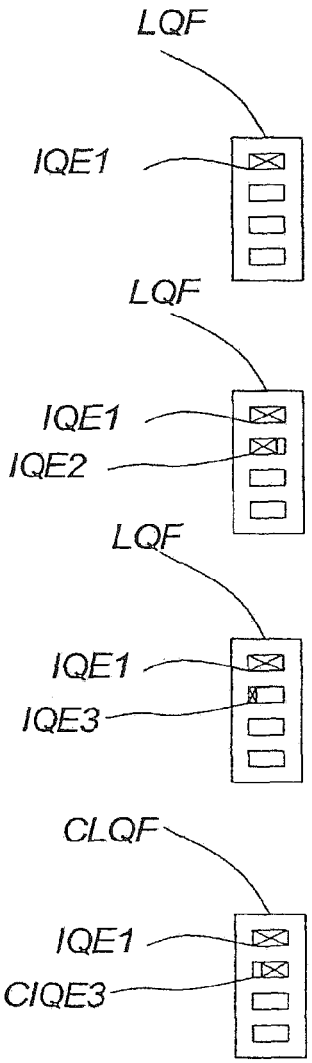
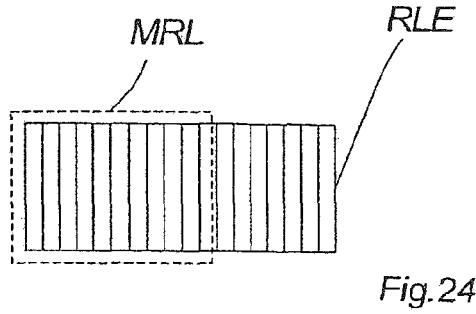
Fig.24a
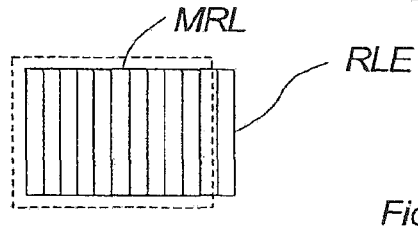
Fig.24b
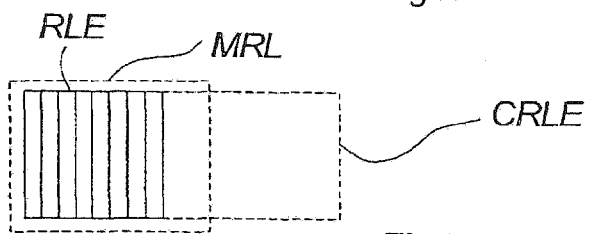
Fig.24c
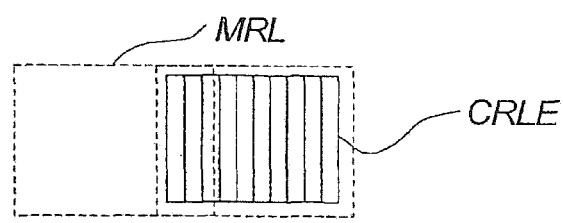
Fig.24d
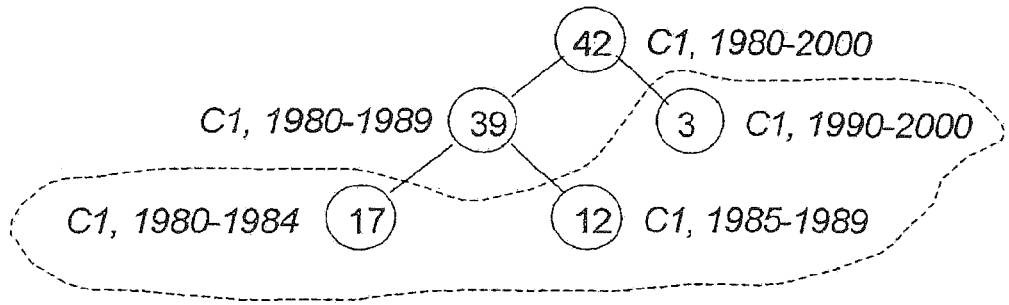
Fig.24e

| Model | Km | Price |
|-------|------|-------|
| Audi | 1000 | 5600 |
| Ford | 2300 | 12345 |

```
<TABLE>
   <TR>
      <TD>Model</TD>    <TD>Km</TD>      <TD>Price</TD>
   </TR>
   <TR>
      <TD>Audi</TD>     <TD>1000</TD>    <TD>5600</TD>
   </TR>
   <TR>
      <TD>Ford</TD>     <TD>2300</TD>    <TD>12345</TD>
   </TR>
</TABLE>
```

USER INTERFACE, SYSTEM AND METHOD FOR PERFORMING A WEB-BASED TRANSACTION

CROSS REFERENCE TO RELATED APPLICATIONS

This application is a continuation of U.S. patent application Ser. No. 10/203,830 filed on Dec. 30, 2002, now U.S. Pat. No. 7,904,369, which is a national phase entry of Application No. PCT/DK2000/00429 filed on Aug. 1, 2000, which claims priority to Denmark Application PA 2000 00222 filed on Feb. 11, 2000, Denmark Application PA 200000638 filed on Apr. 14, 2000, and PCT/DK00/00163 filed on Mar. 31, 2000, all of which said applications are herein incorporated by reference in their entirety.

FIELD OF THE INVENTION

The invention relates to a user interface, a method of establishing a transaction, a search configuration editor, a system adapted to searching for entities contained in web-based data sources (DS), a system, preferably a web-site, a method of calculating a loan offer intended for financing of specifically selected entities such as cars, boats, computer hardware, etc. by means of a system, a system or web-site, and a communication network-based system for exchanging consumer information between at least one entity provider (SP) and at least one mediator (M).

BACKGROUND OF THE INVENTION

Internet-based market places and business transactions are well-known within the art.

The market places may generally be categorized into two different categories.

The first category implies an Internet-based market place offering different items or information for sale. The items or information are/is contained within one data source or one type of data source.

Such market places typically offer a high degree of user-friendly access to the items offered for sale due to the fact that the data are contained within one well-known and well-organized data source, e.g. a single database.

The second category of market place implies a central web-based market place. The items available on the market place are contained in a multiple of data bases accessible via specially adapted client software fitting the individual decentral databases. The client software is located at the decentral provider. The data sources are typically maintained by the individual provider and market places of that type benefit from the fact that a high number of items may be accessed via the market place.

A problem with the first type of market place is that the maintenance of the central database is quite time-consuming unless the data are supplied from several item providers in a well-defined format and at well-defined time intervals. Likewise, automated processing of business transactions requires that the transactions are processed in a way which may be understood and implemented by the item provider. In other words, if a large market place of this kind is desired, high quality two-way logistics are required.

A problem with the second type of market place is also that direct communication to and from decentral ERP systems (ERP: Enterprise Resource Planning) requires that certain protocols or ERP systems are applied decentrally. Consequently, providers will need to change the ERP system in order to connect with the market place.

A further problem with the above-mentioned techniques is that the decentral providers have to deal with significant technical burdens if they want to be connected to the market place. Consequently, many companies may never be connected to the market place which reduce the number and types of possible items offered for sale significantly.

It is an object of the invention to provide an Internet-based market place offering a high degree of compatibility to decentral data sources, both with respect to the search for the data and with respect to associated business transactions.

It is a further object of the invention to provide a system which may provide easy access to a huge amount of items and combinations of such items.

SUMMARY OF THE INVENTION

The invention relates to a user interface (UI), the user interface comprising an input environment adapted to user inputting of search criteria (SC), the search criteria (SC) defining a search for at least one desired entity the user interface comprising a search engine (SE) adapted to performing a search on at least two different web-based data sources (SI, . . . , Sn)

the user interface comprising means for presenting the search result (SR) to the user the input environment being adapted to user inputting of an order (O), the user interface comprising a business transaction engine (BTE) for initialization of a business transaction (BT) based on at least one user input of an order (O).

An important feature of the invention is that the user interface features a web-based "search, find, buy" methodology. Hence, the user may specify the desired entity by means of the user-interface, and subsequently be presented with the found entities matching the established search criteria, and then perform a business transaction by applying the same user interface.

An entity may e.g. be an item, a service or a piece of information.

The entity is typically presented to the user as an offer which may e.g. be selected or purchased via financial transactions.

It should be noted that the above-mentioned principles may naturally be supplemented by conventional techniques. Thus, within the scope of the invention, a system of web-based "search-find-buy" may naturally be supplemented by e.g. "search-find" or "just buy".

In an exemplary embodiment, means for initialization of the business transaction (BT) on a web-basis includes e.g. HTTP, HTTPS, WML or WAP.

When the business transaction engine (BTE) comprises means for initialization of the business transaction (BT) on a web basis, a further advantageous embodiment of the invention has been obtained.

A purely, or at least a partly, web-based search-find-buy transaction may offer a great number of advantages. One advantage is that the user may navigate through several web-sites via only one web-site offering a uniform user interface.

Furthermore, the web-based business transaction method implies the possibility of performing business transactions via order forms already established by the web-based data source owner. Hence, the user-interface may even provide a sale without any mutual commitment between the entity provider and the user interface.

A further advantage is that the user interface may provide entities which may never be established by means of conventional web-sites directly linked to decentral databases. Thus, web-based search-find-buy access to the data sources implies that almost every entity offered for sale on the Internet may be accessed due to the fact that a user interface may communicate with the data source(s) on the basis of common web-based languages or protocols.

This feature is particularly interesting due to the fact that the web-based interface between the user-interface and the data-source eliminates the problem with conventional systems requiring that the data at the different sources must be represented homogeneously.

In an exemplary embodiment, means for initialization of the business transaction (BT) on a web-basis includes e.g. HTTP, HTTPS, WML or WAP.

Specifically, means for initialization of the business transaction (BT) on a web-basis includes utilization of HTML-based order forms, where the HTML-based order forms are associated with the web-based data source in question.

Evidently, the automated business transaction engine may be supplemented by other more conventional (manual) business transaction methods.

When the user interface (UI) comprises means for establishing a search for a combination of at least two entities the search engine (SE) being adapted to performing a search on at least two different web-based data sources (SI, . . . Sn) for the combination of entities, a further advantageous embodiment of the invention has been obtained.

An important feature of the invention is that the user interface offers the possibility to the user of searching for a combination of entities in the sense that the individual entities of the combinations may be searched for separately in different data sources.

A further very advantageous feature of the invention is that the search for combinations of entities may result in the fact that the individual entities of the combination may be found at different web-based data sources, thus facilitating increased possibility of completion of the user-established search.

When the user interface comprises means for storing the search criteria (SC) and means for automatically establishing subsequent searches based on the stored search criteria (SC), a further advantageous embodiment of the invention has been obtained.

When the user interface comprises means for automatically performing a business transaction when entities matching the search criteria (SC) are found, a further advantageous embodiment of the invention has been obtained.

An advantageous feature of the embodiment of the invention is that the result of previous searches may be combined with subsequent searches in a user-friendly way.

When the user interface (UI) comprises a configuration engine (CE), the configuration engine (CE) comprising a graphical tool for establishing a search for at least one combination (xxxxx, yyyyy) of at least two entities and where the at least one combination may comprise entities found at different data sources (SI-Sn), a further advantageous embodiment of the invention has been obtained.

In an exemplary embodiment, a configuration engine may advantageously facilitate a quick search for combinations of entities.

One feature of a configuration engine may be optimization of the search on the basis of the constraints making up the user query.

Advantageous utilization of the configuration engine offers the possibility of taking mutual dependencies between entities into consideration when establishing a selection. An example of such mutual dependencies to be considered may e.g. be delivery costs to be added to the price of the selected entities, if the individual entities of a selection are delivered by different providers.

Other mutual dependencies may e.g. be if a provider offers a discount if the complete, configured product is bought from only one provider.

Other dependencies to be considered may e.g. be information about advantageous combinations of certain items, i.e. if a user intends to buy a piece of software which is known to be poor choice in relation to the computer he intends to buy. Such information should be submitted to the user by the user interface, thereby increasing the user's opportunity to optimize his product configuration.

Another feature related to such mutual dependencies may e.g. be an automatic initial check of whether the user is trying to configure a number of different items without incorporating a certain item type which is actually mandatory to the configuration.

When the search engine (SE) is adapted to performing a real-time search on the at least two different web-based data sources (SI, . . . , Sn), a further advantageous embodiment of the invention has been obtained.

An advantageous feature of the embodiment of the invention is that the data found by the real-time search is up-to-date.

When the search engine (SE) is adapted to performing a search on the at least two different web-based data sources (SI, . . . , Sn) by means of a central database arrangement (CDA), the database arrangement (CDA) being adapted to storing of entities (E) found during previous searches, a further advantageous embodiment of the invention has been obtained.

An advantageous feature of the embodiment of the invention is that the overall search time may be reduced significantly, as the search may be performed by a central database by means of efficient and known database accessing tools.

The database arrangement and maintenance of the data within the database may be performed by means of robots covering certain web-based data sources.

The search itself may be expected to be very fast due to the fact that the search is performed by a central database having low access time.

Moreover, a database offers the possibility of storing the history of the individual entities or groups of entities.

Evidently, the search may be implemented as a combination of real-time and a database search.

When the previous searches are established according to the pre-established trigger conditions, a further advantageous embodiment of the invention has been obtained.

The trigger conditions may e.g. imply a definition of a time interval or a definition of certain criteria established by a user of the data source owner which may trigger a search.

When the user interface comprises means for establishing a conditional order (OM), the conditional order (O) automatically initiating a business transaction performed by the business transaction engine (BTE), if certain predefined trigger criteria are met, a further advantageous embodiment of the invention has been obtained.

Accordingly, a business transaction may be performed conditionally, i.e. when a search for a combination of items e.g. having a certain maximum price has been found. Thus, the user may specify some trigger conditions, which may trigger a business transaction when fulfilled. Such trigger conditions may e.g. be; I want to buy if the total price of the configured product is less than a certain amount of money within e.g. a week.

Evidently, the user interface should facilitate graphical means for establishing such trigger conditions.

When the user interface (UI) comprises means for establishing a loan offer from at least one loan provider, a further advantageous embodiment of the invention has been obtained.

In an exemplary embodiment, the advantageous provision of loan offers via the user interface facilitates an easy business transaction process, as the search-find-buy procedure may be fully integrated into one single process, even if financing of the intended order has to be established by means of a loan.

When the loan offer is established on the basis of at least one user-selected entity, a further advantageous embodiment of the invention has been obtained.

The advantageous provision of establishing a loan offer on the basis of one user-selected entity or a combination of entities facilitates a complete match between the needed funds and the entities which the user wants to buy.

When the user interface (UI) comprises means for accepting a loan offer, a further advantageous embodiment of the invention has been obtained.

When the user interface (UI) comprises means for initiating an order on the basis of the acceptance of a loan offer, a further advantageous embodiment of the invention has been obtained.

When the user interface (UI) comprises means for inputting a set of user-described data, and when the user interface comprises means for submitting a subset of the user-described data to at least one loan providers, a further advantageous embodiment of the invention has been obtained.

According to the above-mentioned embodiment of the invention, advantageous business-oriented communication between the user interface and the loan provider has been established. Hence, the user interface may transfer the subset of user-describing data sufficient for the loan provider in order to decide whether the applied loan may be granted, but not enough to identify the user. Then, subsequently, the loan provider may buy the information from the user interface provider, and a deal may be made between the user and the loan provider without any further interference from the user interface provider.

When the user interface comprises a shopping cart (SC) adapted to storing possible orders, the shopping cart comprising means for selecting at least one of the stored possible orders, and submitting the(se) selected order(s) to an order manager (OM) with the purpose of initiating an order (O), a further advantageous embodiment of the invention has been obtained.

When the shopping cart (SC) may contain abstract orders (O) which will only be converted into real orders handled by the business transaction engine (BTE) if certain predefined conditions are met, a further advantageous embodiment of the invention has been obtained.

Such trigger conditions may e.g. be time limit, certain user requirements to the desired order which may not presently be met (but may be met in the future) or e.g. a condition specifying a desired order to be handled as a business transaction only if a loan provider agrees to offer a loan for the specific deal.

Moreover, the invention relates to a method of establishing a transaction configured by at least one set of entities (x,x,x, x,x; y,y,y,y,y), at least two of the entities being accessible via web-servers (S 1, . . . Sn)

at least one set of entities comprising at least two entities accessible via different web-servers, the method comprising the steps of establishing at least one query (Qn), the query (Qn) comprising a set of desired entities (x',x',x',x', x'; y', y', y', y', y')

searching in at least two of the web-servers (SI, . . . Sn) for entities (x, y) matching the desired entities (x', y'), presenting at least one of the found of set entities to a user (U).

In an exemplary embodiment, complex searches for entities located at different web-based data sources may be performed in such a way that a user may get the impression that the entities are gathered from one virtual source.

Moreover, the invention relates to a search configuration editor, the editor comprising a set of user-selectable identifiers (61, 62,63, 64,65, 66), the editor comprising means for combining the selected identifiers in suitable way.

When the identifiers are searchable by means of search engine (SE) associated with the editor, a further advantageous embodiment of the invention has been obtained.

When the editor comprises means for associating at least one searchable property (71, 72, 73, 74; 79) with at least one identifier, a further advantageous embodiment of the invention has been obtained.

Moreover, the invention relates to a system adapted to searching for entities contained in web-based data sources (DS), wherein the system comprises a number of robots established for extraction of data stored in at least two different web-based data sources (DS).

When the robots are adapted to initiating a business transaction upon request by a user (U), the business transactions being performed by means of communication with at least one of the web-based data sources (DS), a further advantageous embodiment of the invention has been obtained.

Moreover, the invention relates to a system, preferably a web-site, comprising means (SE) for performing a search for entities, the entities comprising at least one entity-describing parameter, the system comprising means for facilitating (UI) selection by a user (U) of at least one entity, the system comprising means for automatically transferring the at least one entity-describing parameter or at least a subset of parameters to a calculation model (113), the system comprising means for processing the parameters according to the calculation model and preferably means for displaying the result of the processed parameters to the user (U).

When the entities are second-hand items or new items, such as cars a further advantageous embodiment of the invention has been obtained.

When at least one of the entity-describing parameters is price, a further advantageous embodiment of the invention has been obtained.

When the calculation model is a model for calculation of a loan offer on the basis of at least the price, a further advantageous embodiment of the invention has been obtained.

When the entity-describing parameters are handed over to different calculation models, a further advantageous embodiment of the invention has been obtained.

When calculated loan offers and loan offer conditions are displayed to the user, and where from the user may subsequently select one of the offered loans, a further advantageous embodiment of the invention has been obtained.

Moreover, the invention relates to a method of calculating a loan offer intended for financing of specifically selected entities such as cars, boats, computer hardware, etc. by means of a system.

Moreover, the invention relates to a system or web-site comprising means for receiving entity-describing parameters from e.g. another system or another site, means for handing the received entity-describing parameters by at least one calculation model, means for processing the entity-describing parameters according to the calculation model, and preferably means for transferring the result of the processed the entity-describing parameters to a user from the other system or site.

When the calculation model is adapted to calculation of loan offers on the basis of the entity-describing parameters, and any further received parameters, a further advantageous embodiment of the invention has been obtained.

Moreover, the invention relates to a communication network-based system for exchanging consumer information between at least one entity provider (SP) and at least one mediator (M), the system comprising at least one application/order form (OF) comprising at least two associated sets of data (AS1, AS2), at least one of the mediator(S) (M) having facilities for receiving at least two of the associated sets of data (AS1, AS2), the system comprising means for transferring at least one of the associated sets of data from the mediator (M) to the entity provider (SP), the system comprising means for requesting at least one further associated set of data (FS) from the mediator (M), the at least one further set of associated set of data being a subset of the associated sets of data (AS1, AS2), the system comprising means for transferring at least one further associated set (FS) from the mediator (M) to the entity provider (SP) in dependency of the request.

An entity provider may e.g. be bank offering loans or e.g. item providers offering different products ors services for sale.

According to the above-mentioned embodiment of the invention, the mediator, i.e. the owner of a market place may guide a potential customer to the entity which the customer wants to buy.

Subsequently, the mediator may advice the entity provider that someone is interested in buying a certain product or service. The information may be associated with data, the associated sets of data describing the desired entity and the potential customer in part.

Then, the provider may decide whether he is interested in dealing with the possible customer, and he may request a complete set of data describing the customer from the mediator.

Evidently, the transfer of the latter part of the associated data may be associated with some kind of payment from the provider to the mediator.

When the system comprises means for assigning an identifier to the associated sets of data in such a way that the mediator (M) may establish the requested associated set of data on the basis of the request, a further advantageous embodiment of the invention has been obtained.

In an exemplary embodiment, the groupings of associated data may be marked with an identifier, so that the mediator and the provider may communicate over a specific and yet, anonymous potential customer.

The associated data may both describe the potential customer and the entity the which customer wants to buy.

THE FIGURES

The invention will be described below with reference to the drawings of which

Figure 2:
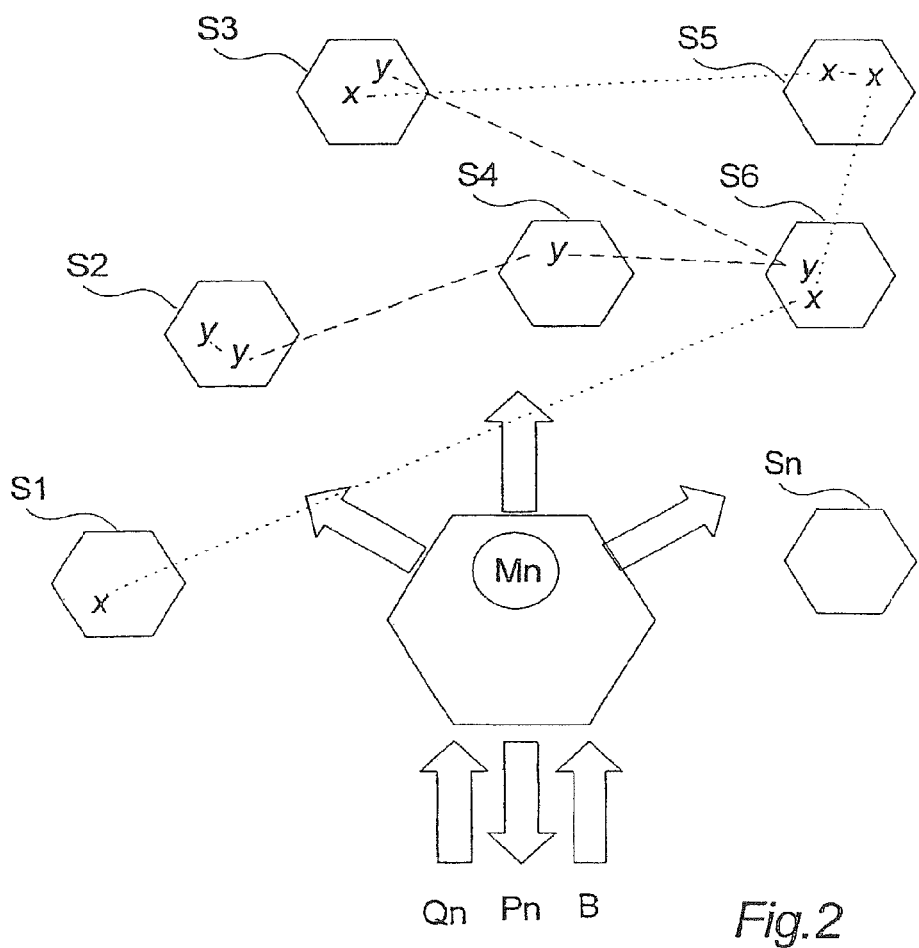
Figure 3:
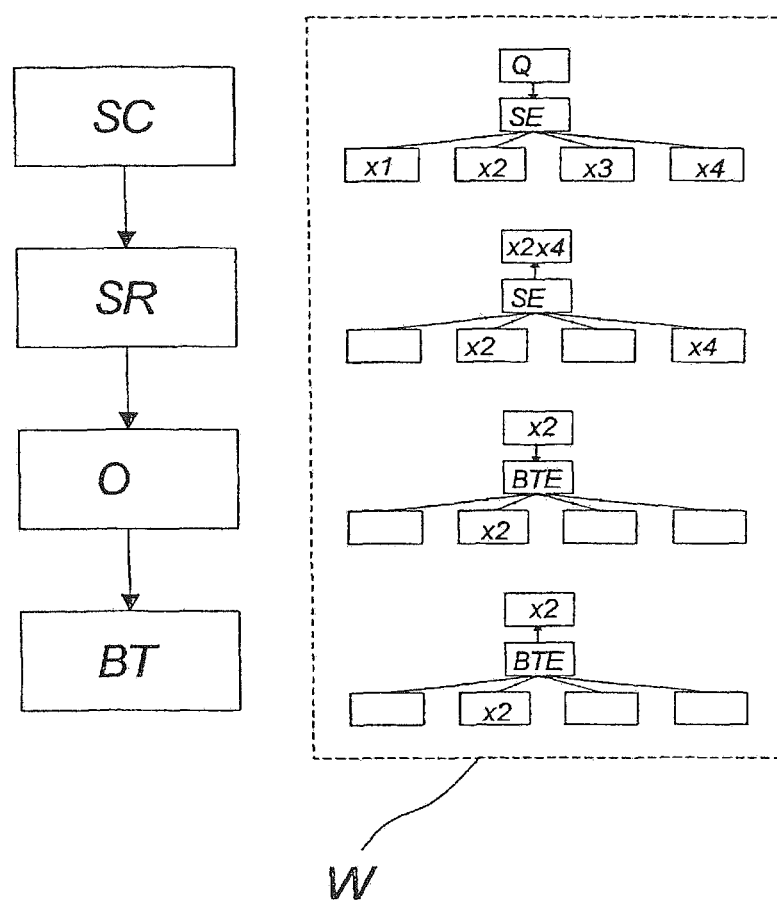
Figure 4:
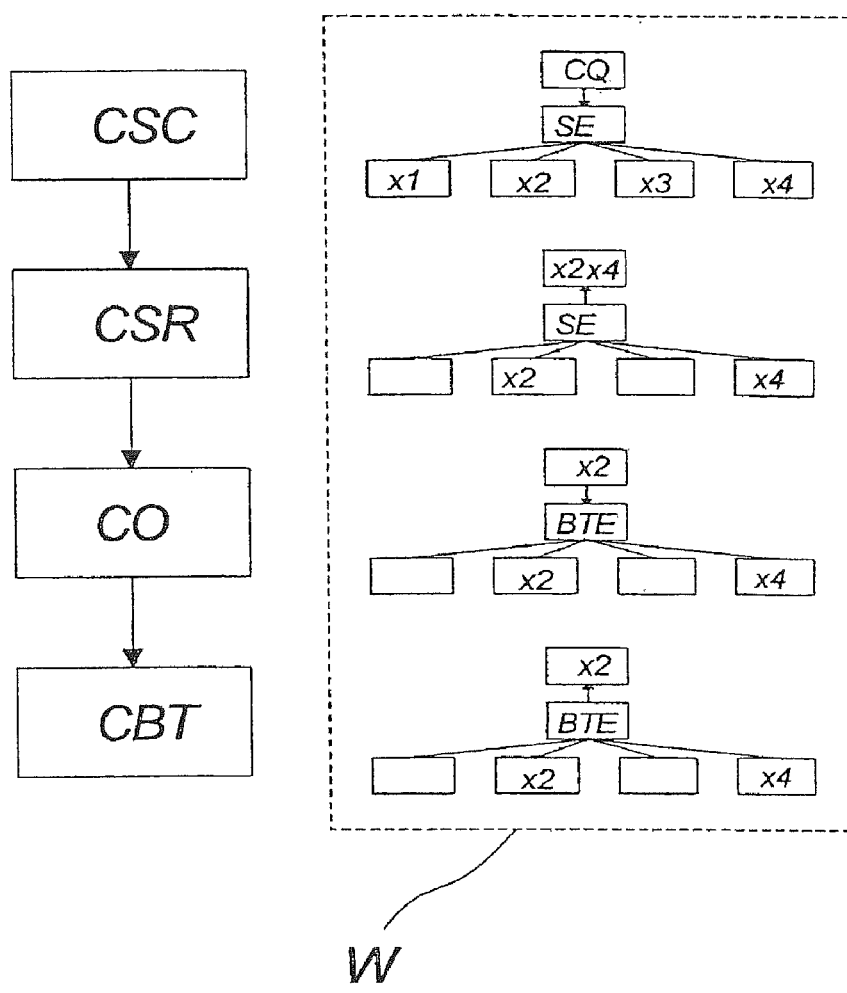
Figure 5:
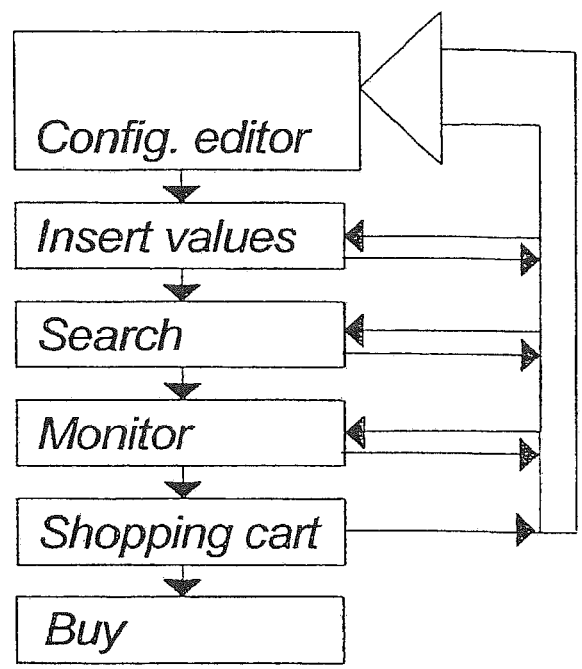

FIG. 1 illustrates the basic features of an embodiment of the invention,

FIG. 2 illustrates the principle of performing a combined web-based search and configuration of data allocated in different data sources, FIG. 3 shows a flow diagram illustrating a search for data allocated in different data sources, FIG. 4 shows a flow diagram illustrating a configured search for data allocated in different data sources, FIG. 5 illustrates the basic principles of a configuration editor in an exemplary embodiment, FIGS. 6-14 illustrate the use of a configuration editor according to one embodiment of the invention, FIG. 15 illustrates the filling-in of data in the search profile, FIG. 16 illustrates a possible presentation of a search result to the invention, FIG. 17 illustrates the principles of web-based access to a multiple of data sources.

Figure 18:
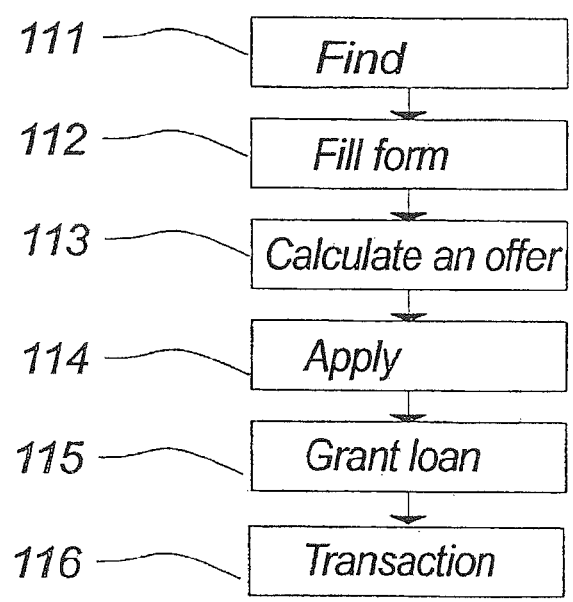
Figure 19:
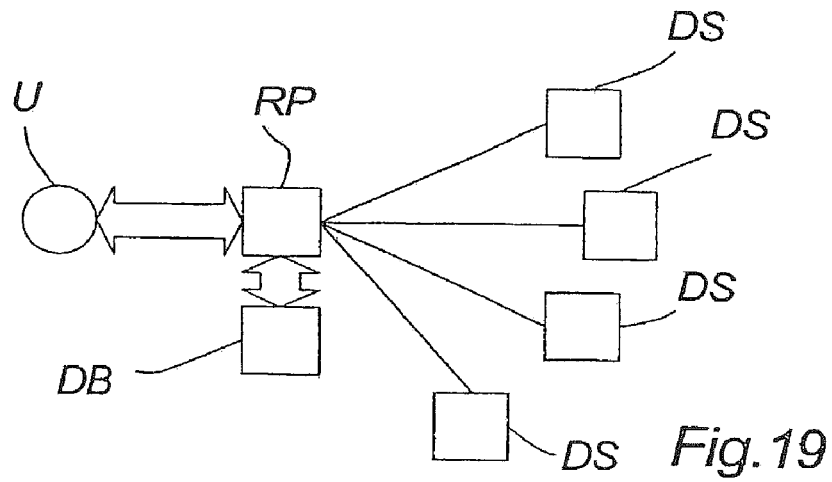
Figure 20:
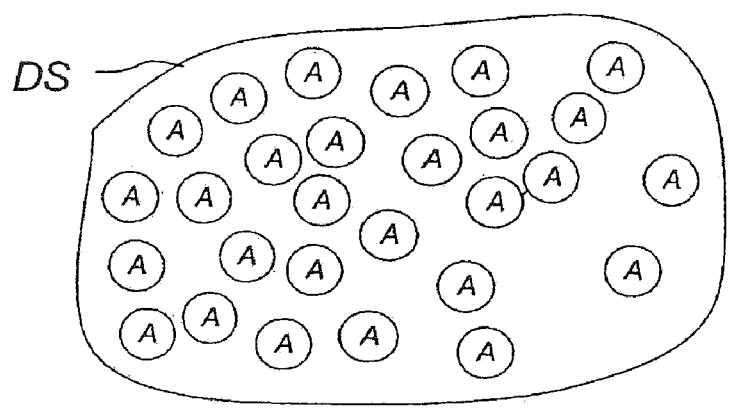
Figure 21:
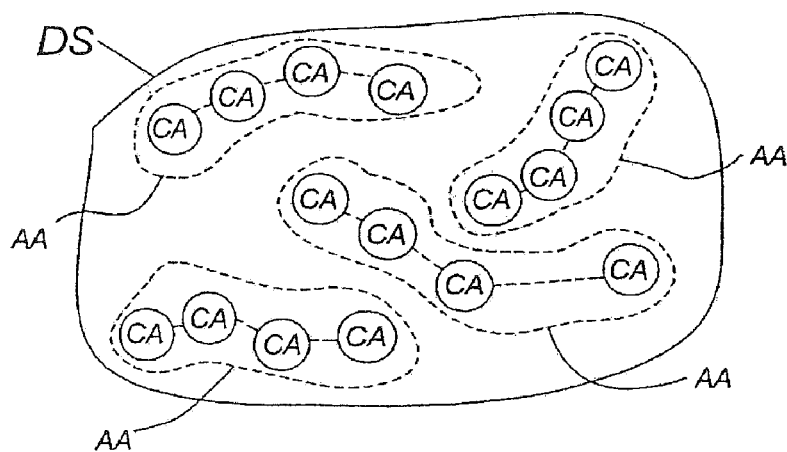
Figure 22A:
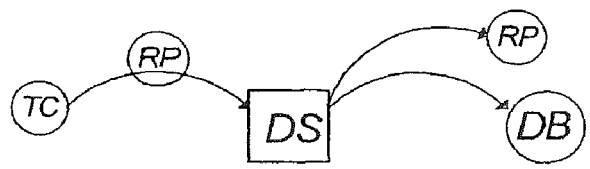
Figure 22B:
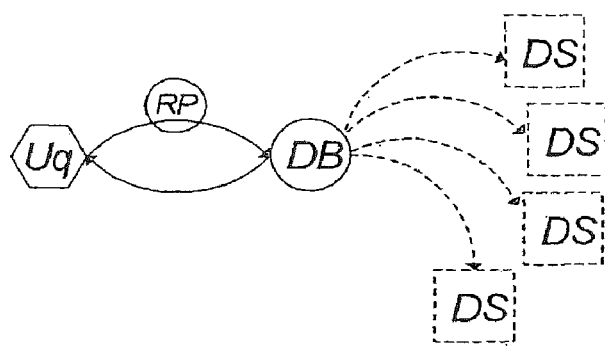
Figure 22C:
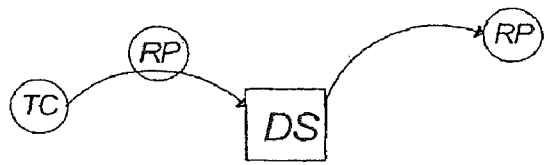
Figure 22D:
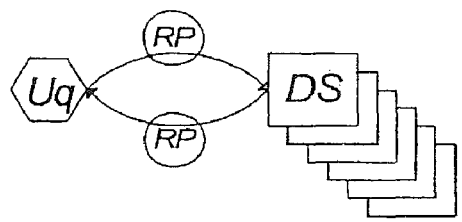
Figure 23:
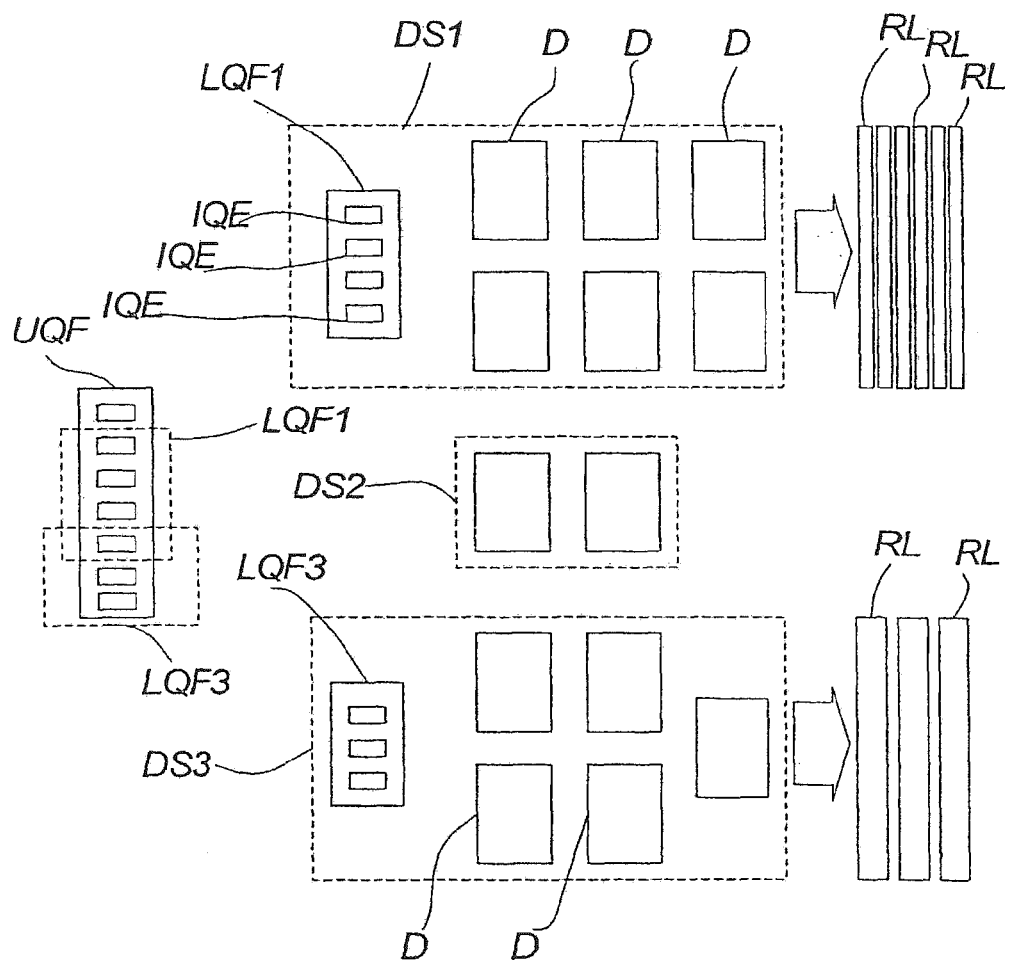
Figure 25:
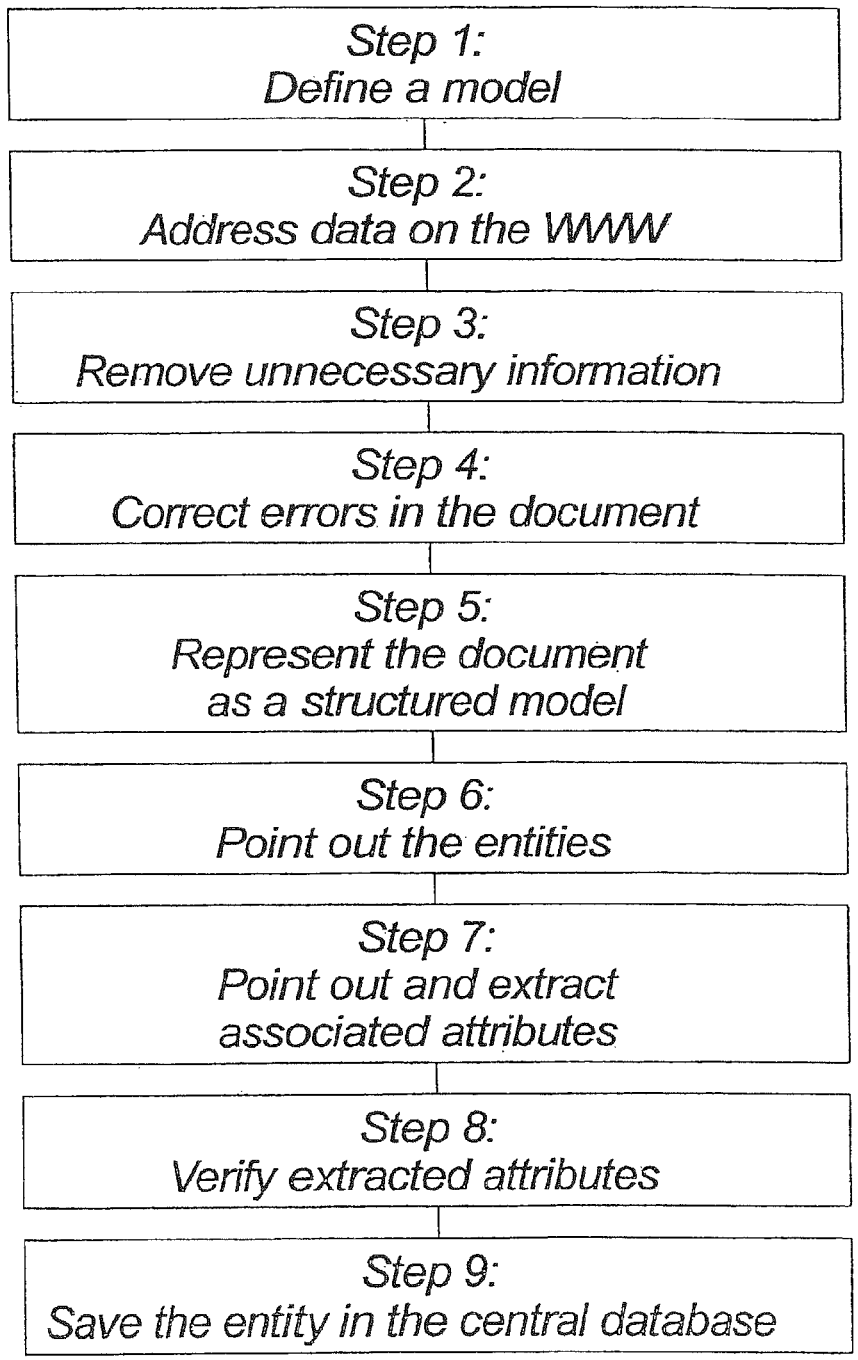
Figures 26A, 26B, 26C:
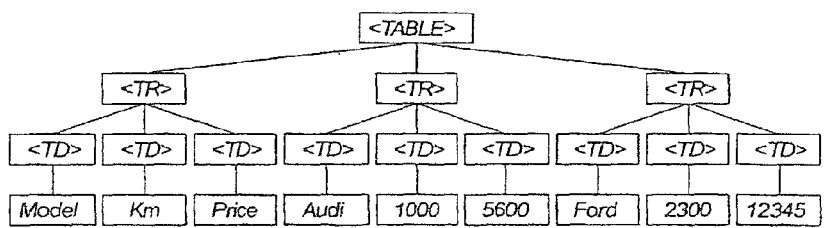

FIG. 18 illustrates a further process flow according to an embodiment of the invention, FIG. 19 shows the basic principle of accessing data sources in and exemplary embodiment, FIG. 20 illustrates the nature of a data source to be accessed in an exemplary embodiment, FIG. 21 illustrates the identification and categorization of attributes of a data source in an exemplary embodiment, FIGS. 22a-22d illustrate access to an individual data source according to an embodiment of the invention, FIG. 23 illustrates the variation of data sources on the Internet, FIGS. 24a-24d illustrate access to a data source via a form according to one embodiment of the invention, FIG. 24e illustrates a detailed method of accessing a data source via a form according to one embodiment of the invention, FIG. 25 shows the basic principles of the search strategy of the invention as a series of steps to be performed (not necessarily in the same order as shown in the figure), FIGS. 26a-26c show an example of a simple table from an imaginary web site and two different representations of the HTML document creating the table.

DETAILED DESCRIPTION

FIG. 1 illustrates the basic features of an embodiment of the invention.

The illustrated system comprises a user interface UI facilitating communication between a user U and a configuration engine CE and a search engine SE.

Moreover, the user interface UI comprises a graphical editor (not shown) for establishment of a configuration of items or properties located at different web-based data sources S1, S2, S3, . . . , S5. Such an editor should preferably be capable of carrying out a "combined" search for a user-defined combination of entities, even if the individual entities must be found at different data sources.

The illustrated search engine may e.g. work on a realtime and/or database-oriented basis by means of the database search engine DBE and/or the realtime search engine RTE.

The realtime search engine may e.g. work on a realtime basis in the sense that a search for specified entities or items is performed (only) when a user actually searches for the entities or items. Evidently, this method results in quite up-to-date search results.

Another possibility is for the market place to be supported by e.g. a huge amount of robots visiting the data sources e.g. at regular intervals, reading and transferring the complete contents of the search data sources to one central database. Evidently, a database search may be performed at high speed due to the fact that the main search is made by one central (well-organized) data base instead of making a search in a plurality of data sources.

Evidently, the above-mentioned techniques may be combined in many different ways with the purpose of optimizing the search.

Finally, the illustrated user interface comprises a business transaction engine BTE adapted to performing a business transaction. The user interface communicates with the business transactions engine BTE via a shopping cart SC and an order manager OM.

The latter element, the business transaction engine BTE, may technically be regarded as a more or less separate business handling module.

The basic function of the illustrated embodiment of the invention is for a user U to perform a search on the web-based data sources SI, S2, S3, ..., S5 for certain specified items or item properties defined by the user by means of the user interface UI.

The search may be performed in such a way that individual items or combinations of items may be found by means of the search engine SE.

The found data may subsequently be presented to the user U, and the user may again specify a desired business transaction by means of the shopping cart SC. Subsequently, when activating the shopping cart, the order manager OM may receive the specified, desired business transaction and prepare the initiation of an actual transaction, preferably on a web basis.

The order manager OM may basically function in two different ways.

The first way involves a user U submitting a specific order to the order manager OM by means of the user interface UI. The order manager will then, substantially unconditionally, initiate a business transaction on the basis of the user-specified entities or items.

Payment conditions etc. may typically be controlled by the order manager OM.

The second way involves a user U submitting an abstract, combined order O, meaning that the user U submits an actual valid order, which is only completed if certain conditions are fulfilled. It should be noted that an abstract may in fact sometimes never proceed to the next business transaction step due to the fact that the specified conditions are never met.

When the order is handed over to the business transaction engine BTE, the business transaction engine will in fact ensure that the desired transaction with the respective data sources is converted into an actual buy/sell process. The process is preferably initiated by means of a web-based order form system.

FIG. 2 illustrates the principle of performing the above-mentioned "search-find-buy" user interface UI, including a combined web-based search and configuration of data allocated in different data sources according to one embodiment of the invention.

The user interface comprises means for performing a user query of combinations of items fulfilling the query Qn. The items are located at different web-based data sources. The data sources are generally independent, e.g. different websites.

According to the illustrated embodiment, two combinations of items xxxxx, yyyyy fulfill the search criteria.

The two combinations are found by means of a matching Mn performed in order to match the inquiry made by the user with the items actually present in the data sources covered by the search engine SE of the user interface UI.

It should be noted that the user is generally not required to possess any knowledge about the different decentral data sources and that the different data sources are accessed by means of one common interface.

The two combinations may now be presented to the user as a presentation Pn showing the search result.

The user interface comprises means for performing a subsequent business transaction B. The business transaction will typically be made as a selection of the presentation Pn. Hence, the user may e.g. select the combination of items xxxxx and initiate a business transaction by means of the user interface presented to the user.

FIG. 3 illustrates the above-mentioned features of the invention.

Starting with the step SC, a search is initiated by means of a query Q to the search engine SE by means of a suitable user interface.

The search engine compiles the query into a search of several data sources, each data source comprising at least one entity or item.

In the next step, SR returns the result of the search performed by the search engine SE, i.e. the items $x2x4$.

The illustrated items xI, x2, x3 and x4 are found in different data sources (according to the illustrated example).

The search result, i.e. the found items x2 and x4, is then presented to the user.

In the next step, O implies initialization of an order. According to the illustrated embodiment, the user selects the item x2 on the basis of the search result presented by step SR. The order is transmitted to the provider at the corresponding data source by means of the business transaction engine BTE.

The last step, BT, business transaction, implies a "handshake" from the provider indicating that a business transaction has been performed.

It should be emphasized that at least two of the involved data sources are web-based, thus offering a high degree of flexibility.

FIG. 4 illustrates a further feature of one embodiment of the invention. The illustrated embodiment is basically based on the aforementioned embodiment, but now it also features a search for combinations of items from different web-based data sources.

Starting with the step CSC, a search is initiated by means of a combined query CQ to the search engine SE by means of a suitable user interface.

The search engine compiles the query into a search of several data sources, each data source comprising at least one item.

In the next step, CSR returns the result of the combined search performed by the search engine SE, i.e. the items $x2x4$.

The search result, i.e. the found items x2 and x4, is then presented to the user.

In the next step, CO implies initialization of a combined order. The user selects, according to the illustrated embodiment, the items x2 and x4 on the basis of the search result presented at step CSR. The combined order is transmitted to the different providers at the corresponding data sources by means of the business transaction engine BTE.

During the last step, CBT combined business transaction, implies a "hand-shake" from the providers indicating that a business transaction has been performed.

It should be emphasized that at least two of the involved data sources are web-based, thus offering a high degree of flexibility.

Evidently, within the scope of the invention, the business transactions engine may sometimes submit combinations of items collected from one data source only. The important feature is that items might be found in different independent data sources.

Turning now to FIG. 5, an exemplary embodiment of a user interface is illustrated.

The flow diagram illustrates the interactions between six main elements of the illustrated user interface. The features of each step will be described in detail in the figures below. However, each step will initially be briefly introduced.

The steps include an initial setup of a configuration editor 51.

The setup of the configuration editor implies a selection of possible items, including the definition of the characteristics of the selected items, the items, to be the target of a search, or a calculation determining whether the search items are actually matching the search criteria.

Evidently, the above-mentioned setup of a configuration editor may be omitted within the scope of the invention, when applying one or several predefined search/configuration user interfaces, each adapted to a more or less specifically configurated search.

The next step 52 implies insertion of specific values determining the scope of the search.

If the user prefers to modify the involved items and items after initial insertion of values, he may return to the configuration editor 51 and reconfigure the combination of items to be searched for.

The next step 53 implies a search for the previously specified items.

Subsequently, the next step 54 implies presentation of the found items matching the established search criteria.

Again, the user may return to step 51 or 52 in order to redefine the established configuration or modify the inserted values.

If, on the other hand, the found combination of items fulfills the expectations of the user, the combination may be transferred to the shopping cart 55.

Again, the user may return to steps 51, 52, 53 or 54 in order to redefine the established configuration or modify the inserted values or perform a supplementary search.

In principle, the shopping cart may be adapted to storing several combinations of interest matching different established search criteria, and subsequently, the user may carry out a final selection of the one (or several) combination(s) which he wants to buy.

Finally, when the user has made such a selection, he may place an order on the selected combination and a business transaction may be performed.

The above-mentioned process flow may also be regarded as a search S1, find S2 buy S3 process.

The first step of establishing a search profile by means of the configuration editor 51 will now be explained in detail with reference to FIGS. 6-14.

Figure 6:
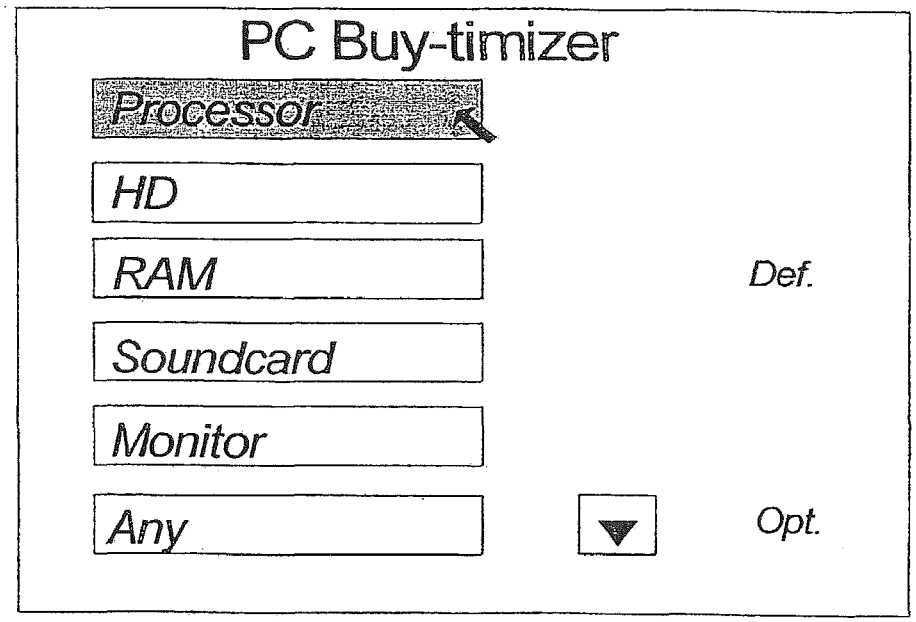

FIG. 6 illustrates the initial step of entering an opening session by means of a partly predefined combined search.

The illustrated user interface is specifically predefined for PC searches.

Evidently, predefined configurations may be established for other types of standard searches.

Initially, it should be noted that the illustrated configuration setup is only exemplary, and should in no way restrict the scope of the invention.

The opening session features a user interface 60 designed for PC searches.

The interface comprises six item-defining identifiers, processor 6 1, HD 62, RAM 63, Soundcard 64, Monitor 65 and Any 66.

Evidently, several other setups are possible within the scope of the invention.

Each of the illustrated identifiers 6 1-66 may subsequently be further refined.

The term "items" may principally imply different definitions depending on the specific application.

In one example, the term "items" implies an object which may be acquired from a provider and which differs from the other items involved in the configuration.

Consequently, "items" may sometimes cover a combination of other (sub) items.

According to the illustrated embodiment, a user activates the identifier, Processor 61, and a new menu appears, as illustrated in FIGS. 7A-7E.

Figure 7A:
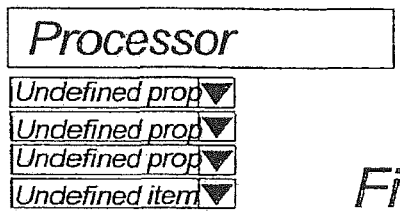

FIG. 7A illustrates the illustrated processor item which may be defined by means of four properties 7 1-74 which are initially undefined.

Figure 7B:
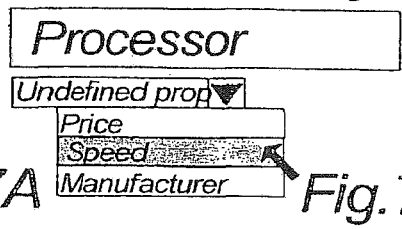
Figure 7C:
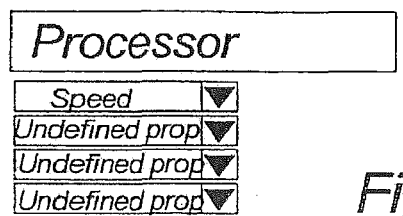
Figure 7D:
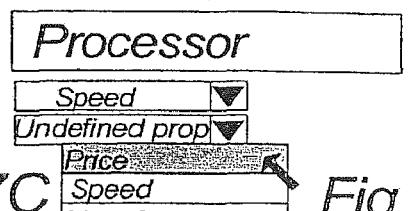

In FIG. 7B, the first 7 1 of these four properties is chosen by means of a curtain 79 to represent the property speed, and in FIG. 7D the property is defined as price. The properties available by means of the curtain are specifically related to the processor item in the sense that the properties are automatically restricted to properties actually searchable in the market place. Evidently, other properties than the illustrated properties may be related to a processor item.

Figure 7E:
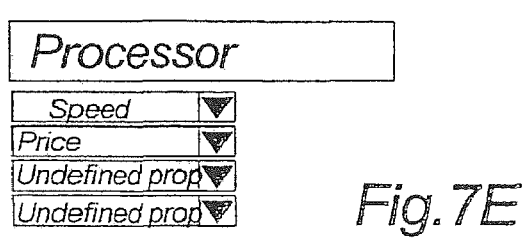

Finally, FIG. 7E illustrates the final configuration setup of the processor item.

FIG. 8 illustrates a UD mark which has been made at the processor identifier 61, indicating that the user has modified the identifier.

Moreover, the user selects the identifier 62 defining the properties of a hard-disc and a new menu appears in FIGS. 9A-9E.

The illustrated sequence shows that the identifying properties are chosen to be disc capacity and price.

Figure 10:
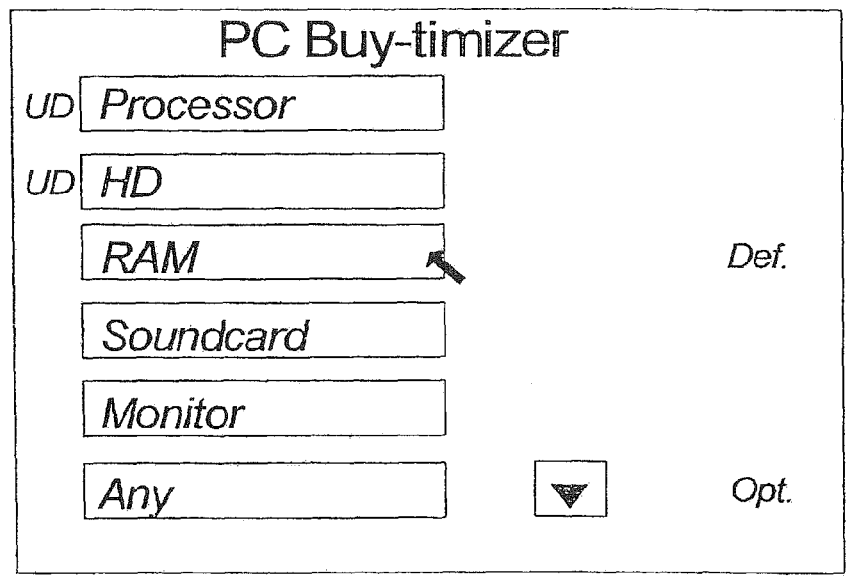

Turning now to FIG. 10, a UD mark has been added at the HD identifier 62, indicating that the user has modified the identifier.

Figure 11A:
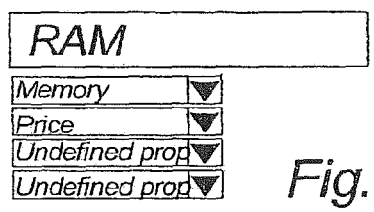
Figure 11B:
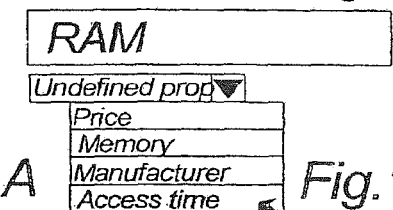
Figure 11C:
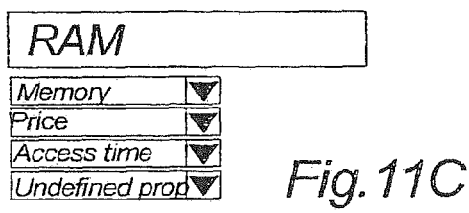

Now, the identifier RAM 63 has been chosen by the user and a new menu appears as illustrated in FIGS. 11A-11C.

It should be noted that the initial menu in FIG. 11A contains a predefined setup of properties, i.e. capacity and price. Evidently, if a configuration editor should be predefined for PC-search purposes, such default setups should preferably be made for each chosen identifier 61-65 in order to facilitate a high degree of user friendliness.

The illustrated flow shows that the user adds the Access time property to the property settings.

The next step of dealing with the identifier Any 66 is a little more complicated. Nevertheless, it reveals a remarkable feature of the embodiment of the invention.

This feature will be described with reference to FIGS. 12, 13A and 13B.

As indicated, the identifier Any 66, which may naturally comprise several identifiers, may be applied for combining the search for the computer hardware with a softer search for a piece of furniture to be used together with the equipment as comprised by the identifiers 61-65.

When selecting the identifier 66, as new menu appears which is slightly different from the aforementioned menus.

Figures 12, 13A, 13B:
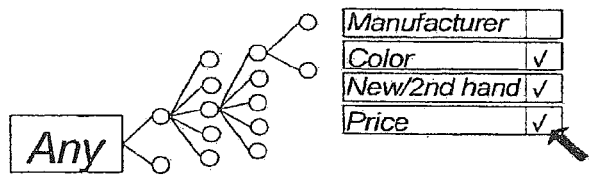

The menu appearing as illustrated in FIG. 13A comprises a facility adapted to choosing an item from a selection of pre-defined possible items. The illustrated item, monitor furniture, is selected by means of tree structure, each node of the tree structure defining the desired items of a group of items.

Evidently, many other possible selecting tools may be applied.

The selected item, monitor furniture, offers the possibility of attaching four different search properties to the item, Manufacturer, Color, New/$2^{nd}$ hand and Price.

According to the illustrated setup of FIG. 13B, the user chooses the last three properties Color, New/$2^{nd}$ hand and Price.

Figure 14:
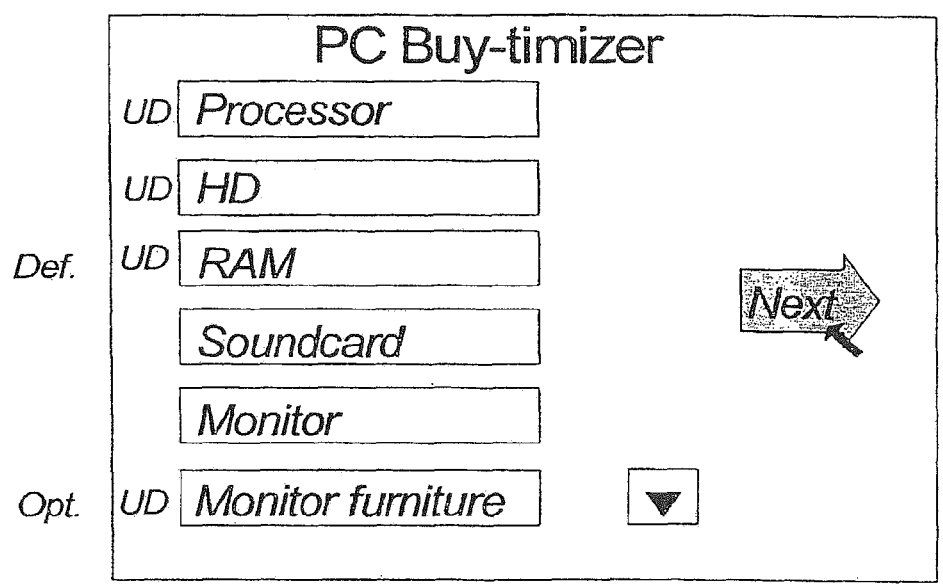

Now, as illustrated in FIG. 14, the configuration editor has been designed by the user to comprise the desired searches.

It should be noted that especially the last feature, i.e. adding of items not closely related to other items, offers the possibility of very strong and user-friendly data acquisition. This is due to the fact that the underlying data sources of the configuration editor are web-based and do therefore offer a considerable amount of information and several items, i.e. 2nd hand items, not usually for sale in large-scale market places.

When the user is ready for the search, he may select the Next button in order to insert values according to step 52 of FIG. 5.

Turning now to FIG. 15, the user has inserted the value 1000 MHz as a property search criteria with respect to the processor. Moreover, the user has inputted the value 20 Gbytes as the minimum capacity of the hard-disc, 128 Mbytes as the minimum RAM storage capacity and the monitor furniture has been specified as white and potentially a $2^{nd}$ hand offer.

The inserted values may be regarded as entity-describing parameters.

Now, the user has the option to search for the items individually by means of the Search Components button 151 or choose the search configuration button 152.

The Search Configuration button 152 has been specified by the value $1500 inserted in the configuration area.

According to the illustrated flow, the user now selects the latter button, thus initiating a search for the components in the left hand area, restricted by the inserted values AND the inserted value inserted in the right hand area, determining the total maximum price for the configured PC and the furniture.

FIG. 16A illustrates step 54 of FIG. 5, namely a listing of the found configurations matching the specified search.

According to the illustrated search, three configurations fulfilling the search criteria have been found and they are displayed as Matching configurations 1, 2 and 3.

As illustrated, the user now selects the configuration and combination of items of actual interest.

It should be noted that the user may not necessarily gain knowledge of how and where the different items may be offered for sale (superfluous to the user). It should moreover be noted that the user has the possibility of returning to the previous display setups by means of the buttons 16 1 and 162, if so desired.

The selected configuration is now transferred to the shopping cart. However, it should be noted that the user may still perform new searches and modify the identifiers, if so desired.

Finally, the user may choose one or several configurations of items (only one is shown) and perform a business transaction by means of the button 165.

If, on the other hand, no matching configurations of items were found, a business transactions may still be initiated by transferring the established search criteria to the shopping cart (not shown) and specifying the conditions under which such business transaction may actually be performed.

Such condition may e.g. imply a transfer of the inserted values of FIG. 15 to the shopping cart, specifying another total price for the complete configuration, e.g. $1100 as a trigger condition for a business transaction.

Further trigger conditions may e.g. be time limit, e.g. a week, within which the buying order is valid.

Consequently, a shopping cart may be applied both for a specific order and an abstract order.

A further attractive possibility may be exploited by a user by activating a button 165. Activation of each of the applied buttons 165 will imply a transfer of information describing the associated configuration (at least the total price) and a loan offering engine (not shown). The loan offering engine may be adapted to presenting a number of loan offers based on supplementary personal information provided by the user and information describing the configuration associated with the activated button 165. The loan offering engine may e.g. be partly administered by a bank.

If the user chooses to accept a loan offer, he may then accept the loan offer and the information may be returned by the loan offering engine in such way that it may be validly (and securely) submitted to the item provider offering the desired item(s) for sale, and a business transaction may instantly be processed.

FIG. 17 illustrates a number of data sources attached to a user interface UI.

At least two of the involved data bases DB are indirectly accessible via a web-platform WP. In this respect, a data source is regarded as a database and an associated web-platform.

Evidently, the user interface may be supplemented by other data bases DB directly accessible e.g. by means of agents performing data retrieval on an ODBC or SQL basis.

Nevertheless, a main feature of the invention is still that many data sources are made accessible via a web-platform. This is due to the fact that the web-platform represents a uniform and well-distributed data exchange interface between the data bases DB and the user interface UI. Hence, a data source owner may easily attach his data source to the market place (represented by the user interface UI) in an easy and relatively secure way due to the fact the web-platform is accepted by the user interface UI. Moreover, most companies may reuse the already established web-based homepages as links to the market-place, thereby reusing both their product representation and their already established web-based business transaction interface.

Moreover, when seen from the point of view of a technician, the system benefits from the fact that the data from the data sources are all represented quite homogeneously in the sense that interfacing is basically established by the same protocol techniques. On the other hand, it should be noted that implementation of the web-platform WP may differ significantly from data source DB to data source DB, thereby shifting the burden of establishing an interface between the web-based data sources from the data source provider to the user interface UI provider.

It should also be noted that the establishment of a user interface capable of communicating with web-based data sources creates a mutual independence between the user interface provider and the data source provider.

A purely, or at least a partly, web-based search-find-buy transaction may offer a great number of advantageous. One advantage is that the user may navigate through several web-sites via only one web-site offering a uniform user interface.

Furthermore, the web-based business transaction method implies the possibility of performing business transactions via an order form already established by the web-based data source owner. Hence, the user-interface may even provide a sale without any mutual commitment between the entity provider and the user interface.

A further advantage is that the user interface may provide entities which may never be established by means of conventional web-sites directly liked to de-central databases. Thus, the web-based search-find-buy access to the data sources implies that almost every entity offered for sale at the Internet may be accessed due to the fact that a user interface may communicate with the data source(s) on the basis of common web-based languages or protocols.

This feature is particularly interesting due to the fact that the web-based interface between the user-interface and the data-source eliminates the problem of conventional systems requiring data at the different sources to be represented homogeneously.

In an exemplary embodiment, means for initialization of the business transaction (BT) on a web-basis includes e.g. HTTP, HTTPS, WML or WAP.

Specifically, means for initialization of the business transaction (BT) on a web-basis includes utilization of HTML-based order forms, where the HTML-based order forms are associated with the web-based data source in question.

Evidently, the automated business transaction engine may be supplemented by other more conventional (manual) business transaction methods.

Turning now to FIG. 18, a further process flow according to an embodiment of the invention has been illustrated. The process flow basically comprises five process steps,

111, 112, 113, 114 and 115.

Process step 111 of one or a combination of entities (such as items) is found by means of a suitable user interface. A suitable user interface may e.g. be an interface adapted to search at least one data source for certain user-defined entities, such as items, services, travels, cars, books, apartments, etc. automatically or upon request by a user.

The user interface should preferably comprise a user interface accessible to a user U via the web.

The entity(ies) would typically be found by means of more or less intelligent search tools. The search tool submits one or several entities as a response to a user query. The submitted entities comprise a number of entity-describing parameters EP, such as brand, type, age, price, etc, if it is a car. The user may then acquire a loan offer matching the found entity, e.g. by selecting a button 165 associated with the found entity.

Evidently, such offers may also be provided automatically once the entity has been selected by the user and handed over to the order manager OM.

In the next step 112, a suitable number of the entity-describing parameters (properties) is inputted in one or more calculation models and the user inputs certain personal information (if required). The calculations are subsequently presented to the user according to suitable guidelines on the basis of the parameters and the additional personal information, if any.

It should be noted that the previous search for the entity, step 111, may be executed on another web-site (i.e. another market place), and subsequently, the entity-describing parameters may be handed over to another site for subsequent processing of step 112 and any further subsequent steps.

All necessary entity describing parameters are handed over to step 112 and the user may input certain parameters, such as payment, tax rate, etc.

Subsequently, step 113 may calculate a loan offer matching the desired entities. The calculation may be performed at a user interface server or the data may be submitted for more or less camouflaged external processing, i.e. transferred to an bank server.

Another way of external processing may e.g. be an "anonymous" request made by the user interface UI server to a bank. The request should preferably be made in such a way the request contains only customer-describing parameters only and no customer-identifying parameters.

In this way, the bank may keep the calculation model secret, and the request by the user may be kept anonymous until he is absolutely sure that he will actually apply for a loan.

If the calculation of a loan offer is to be made at the user interface server, the calculation model should be integrated in the portal.

In step 114, the user may actually apply for a loan based on one or several offers from different loan providers.

The application is processed in step 115, and the loan may be granted or refused.

If the loan is granted, the user interface should preferably facilitate a business transaction upon grant of the loan. Thus, the user should preferably be pipelined directly to the a business transaction, where payment for the selected entities is actually made to the entity provider more or less directly by the loan provider.

The loan provision may thus be integrated in the complete business transaction according to the embodiment of the invention.

Turning now to FIGS. 19-26, the basic principles of possible access to web-based data sources by means of a search are illustrated. Evidently, a search engine may be established in other ways than that illustrated by the embodiments.

FIG. 19 shows the basic principle of accessing data sources according to one embodiment of the invention. Evidently, numerous other methods are applicable within the scope of the invention.

The illustrated system is run by standard computers e.g. mutually connected via the Internet.

The illustrated system comprises a plurality of data sources DS. The data sources DS are generally independent, at least with respect to the form according to which data is stored in the individual data sources. Typically, there will no common access key to the data elements of the data source.

In an exemplary embodiment, a large number of independent web-sites may be accessed by means of the same retrieving profile.

An typical independent data source may be understood as a data source being established independently of the retrieving profile RP. In other words, when established the retrieving profile no help for automatically interpretation should be expected from the data source at all.

An important characteristic of an independent data source is that an entity is retrieved from the data source without the transferring of unique ID coding. The identification of the individual transferred entities is based solely or primarily on the basis of the combinations of the attributes comprised in the retrieved entity and/or the environment from which the entity is retrieved due to the fact that no unambiguous key related to the entity should be expected from the data source.

Hence, according to one teaching of the invention, the relaxed requirements with respect to syntax and representation of the entities of a data source facilitate access and roboting of data sources which, until now, have been accessible only via manual search.

An example of representative data sources of the above-mentioned kind may e.g. be a web site offering second-hand cars. Each web-site is typically owned by independent car dealers offering different car models from different years, different prices, etc.

An important feature of the exemplified type of data source is that a car of a certain type, model and year may be offered for sale at different prices by the car dealer due to e.g. different price policies and different conditions of sale. This aspect illustrates that the mere identification of a car model at a web-site only reveals very little information about the specific car offered for sale. In the light of that explanation, each second-hand car offered may be regarded as unique.

Other examples of such data sources may e.g. be job-advertising, loan offers, odds, offers, news, etc.

Evidently, data sources may comprise combinations of new and second-hand objects or even other types of objects.

The nature of a data source will be described in detail with reference to FIG. 20.

Returning now to FIG. 19, each data source DS may be visited by a user U via a retrieving profile RP. The illustrated embodiment of the invention includes a database DB which may be accessed for reading and writing purposes via the retrieving profile.

Each data source may be visited via the retrieving profile RP if a user U addresses a query at the involved data sources DS. The retrieving profile RP may be implemented in several different ways within the scope of the invention.

According to the illustrated embodiment, the retrieving profile RP comprises robots each accessing the different data sources DS and retrieves information about a certain domain of entities. An example of such a domain may e.g. be the above-mentioned domain of cars offered for sale. The retrieved information may be interpreted by the robot and the information stored wholly or partly in the database DB in an easy searchable format. Evidently, the database may link the user to the original data sources if so desired. The up-date rate of the robot may be established according to several different trigger criteria. One of the criteria may be a robot dedicated to a certain data source and adapted to visiting the data source at certain time intervals.

According to the illustrated embodiment of the invention, a query may be carried out by means of a search in the database DB instead of visiting the data sources.

Hence, the function of the retrieving profile is to guide one query or a set of queries in such a way that each entity matching the user query may be presented to the user.

Another possible implementation of the retrieving profile (not illustrated) may be an encapsulation of each or some the data sources in such a way the query is suitably directed at the contents of a data source. The most important function of such an encapsulation contained in the retrieving profile is to avoid unnecessary searching in parts of the data source which have already been identified as irrelevant to the specific user query.

Returning now to the illustrated embodiment, an example of a query established by the user U may be a query for a car of the type "Porsche" less than three years old and offered at a price interval of $10,000 to $11,000. The query may typically be invoked by filling in a form offered to the user U at a web based market place controlling or facilitating the illustrated system. The retrieving profile RP may subsequently perform a search in the database DB without consulting the data sources and the result may be listed to the user at the provider web-site. A user may subsequently choose to access the original data sources, e.g. the web-site, in order to obtain additional information, such as a picture or further description of the located cars via a link associated with the car in the result list.

The retrieving profile RP may be regarded as a program structure established in order to match a user query to all data sources inferred by a user request.

FIG. 20 illustrates the complex nature of a data source to be accessed. The illustrated data source DS has a data structure which is initially unrevealed and incompatible with the access tools of the retrieving profile RP associated with the specific data source DS.

Initially, the data source DS regards the automatic retrieving profile as a chaotic plurality of information. According to the illustrated embodiment, the character-based information of the data source DS has been converted into a number of attributes of identified text strings. Evidently, attributes may be encoded and decoded in various formats such as character based formats, image based formats and active content formats, such as Java applet, JavaScript application or VB script application.

The text strings may e.g. be a mix of text strings identifying car names, model names, numbers, etc.

Subsequently, the data source must be evaluated and interpreted in order to facilitate access to hidden information by the retrieving profile RP.

FIG. 21 illustrates identification and categorization of attributes of a data source.

The attributes, i.e. the text strings of the data source, may subsequently be interpreted and combined into so-called entities of associated attributes ASA. The associated attributes may be established so as to comprise certain predefined types of attributes, i.e. categorized attributes.

An example of an entity is a car entity comprising the categorized attributes CA "Trabant", '88 and $100,000 where the first attribute of the category is car model, the second attribute of the category is manufacturing year and the third attribute of the category is the price.

Each entity is established as a set of associated attributes ASA and the irrelevant attributes are filtered away.

Evidently, the establishment of entities of associated attributes may be performed in several different ways, and more or less automatically, within the scope of the invention. It should be noted that the preferred embodiment of the invention implies a completely automatic establishment of as many robots as possible.

Subsequently, the identified entities may be copied into the central database DB means in such a way that the retrieving profile initially performs a query in the database instead of visiting every involved data source DS and lists the results to the user according to a predefined listing format. This feature ensures quick access to the search result. If the user U requires additional information, this information may be obtained by means of a link contained in the above-mentioned result list.

When the entities have been copied to the database and associated with the retrieving profile, further information is added to the retrieving profile in the form of a robot adapted to the data structure of the specific data source. This robot is associated with the retrieving profile in order to visit the data source according to certain trigger criteria and to reevaluate the data source in order determine whether the contents of the data source have been changed. Hence, the robot will access the data source e.g. at certain intervals and update the contents of the database if changes have occurred. Such an automatically handled change may take place if e.g. one entity has been removed from the data source and replaced by two other entities where the removed entity represents a sold car and the two new entities represent cars introduced for sale.

Such a change observed by the robot should of course be reflected in the database, as the sold car has to be removed and the two cars be added to the database in order to reflect the state of the data source when the data source is visited.

A change may likewise be stored and registered for statistic purposes in another database.

If, on the other hand, the data structure of the data source has changed in such a way that the robot is no longer able to extract the correct information, an error is reported to the retrieving profile. Such an error results in the establishment of a new robot fitting the new structure of the data source.

It should be noted that each data-source typically requires a dedicated robot.

FIGS. 22a to 22d illustrate some important features of the invention with respect to the above-mentioned retrieving profile RP. It should be noted that the two different ways of operating the retrieving profile are only examples and do in no way restrict the operation of retrieving profiles to only the illustrated two. The use of the retrieving profiles implies several possible modifications within the teaching of the invention.

The circles involve a system operation or system source, the squares involve an independent data source and the hexagonals involve a user operation such as a query.

FIGS. 22a and 22b illustrate the operation of a retrieving profile if a method involves the utilization of a central database.

According to the first embodiment, the retrieval/analysis of data from a data source DS and the retrieval of data from the data source performed by a user via a user query are basically two different processes (operations).

FIG. 22a illustrates a first embodiment according to which the system analyzes and retrieves information from a single data source basically independently of any user query.

The operation may be as follows: A data source DS is visited as a result of the fulfillment of certain trigger criteria TC. Visiting the data source DS is established via the retrieving profile RP. No structural information about the data source will be found if the data source has not been visited before. Such a situation triggers an initial analysis of the data source. The extracted entities are stored in the central database DB according to predefined storing criteria and a robot is established for later access to the data source according to the identified data structure of the source. The robot will be contained in the retrieving profile.

In another scenario, the data source will be accessed directly by the already established dedicated robot if the retrieving profile related to the specific data source contains information determining the data structure of the data source.

The retrieving profile is subsequently modified if minor changes in the data structure of the data source are detected insofar the existing robot may be suitably modified. If not, an error flag is raised and a new robot has to be included in the retrieving profile.

Evidently, several different trigger criteria may be established within the scope of the invention.

FIG. 22b illustrates the function of the system from another point of view. The figure illustrates the invoked procedures if a user query Uq is established according to the illustrated embodiment of the invention. A user query Uq is entered via e.g. a user query form, e.g. a web site. The user query Uq contains different entries specifying the desired information within a certain domain. This query invokes a search in the central database DB containing a "mirror" of all entities identified in the searched data sources as described above.

The search may be performed in a quick manner due to the fact that the entities are contained in a database having a high degree of order.

The result of the search is returned to the user in a predefined way and the user may typically be guided to the original data sources DS by means of a link incorporated in the result list if the user so desires. This option is illustrated by the dotted lines.

It should be noted that the procedure of traversing through the involved data sources and the establishment of a central database according to the illustrated embodiment are separate functions and principally non-correlated with the search performed in the database upon request by a user query.

The basic understanding of the application is that the maintenance of the system is separated from the utilization of the system.

Turning now to FIGS. 22c and 22d a further embodiment of the invention has been disclosed. This embodiment implies a higher degree of correlation between the maintenance and the facilitated queries.

FIG. 22c illustrates the initial establishment of a retrieving profile RP fitting a specific data source DS. The establishment is triggered by certain trigger conditions.

The retrieving profile RP will be updated when the data source DS has been analyzed and the data structure of the data source has been identified. The retrieving profile RP is established as an encapsulation of the corresponding data source DS. However, in this case no data will be stored in a database. Instead, the retrieving profile RP may be regarded as a robot dedicated to a specific data source, and the robot may be triggered by a user query.

FIG. 22d illustrates a user request Uq triggering access to some data sources DS containing the entities matching the user query.

When the desired entities have been retrieved, the result is returned to the user and the retrieving profile is updated if relevant changes in the data structure have occurred.

The retrieving profile RP of the illustrated embodiment contains information matching the user query Uq to the already analyzed contents of the data sources. Such a retrieving profile requires a high degree of refinement in order to obtain a real-time search in the data sources. It should be noted that access to the individual data sources may be quite time-consuming. Hence, in order to reduce the query response time, the retrieving profile should contain quite a lot information about the entities and the grouping of entities in the individual data sources.

It is to be noted that local query tools may be used for both real-time and full extraction.

Finally, it should be emphasized that the above-mentioned access philosophies may be combined if so desired.

In order to explain the quite complex situation of visiting independent data sources, a further detailed explanation will be provided below.

FIG. 23 illustrates the variation of data sources on the Internet. Specifically, the example illustrates that several different access methods have to be established when dealing with different types of data sources in the form of web-sites.

FIG. 23 illustrates three different independent data sources DS1, DS2 and DS3.

Each data source forms an Internet web-site open to public access.

The first data source comprises a number of documents D accessible via a local query form LQFI. The form comprises a number of input fields, IQE, by which a user may input certain types of entries in order to conduct a search. Traditionally, such entries may be established via dedicated input fields. Evidently, several other input forms may be applicable.

The result of a query is monitored by a number of result lists RL and each list comprises a maximum number of hits. At some sites, such list are truncated if the number of hits exceed a certain number and data is lost.

Another data source DS2 comprises a web site of two documents. The site offers no form facilities and the information is presented by means of simple listing or even as pure text documents.

A third data source DS3 also comprises a number of documents D which may be queried by means of a local query form LQF3. The form comprises a number of input fields by which a user may input certain types of entries in order to conduct a search.

As for the data source, DSI, the result of a query is monitored by a number of result lists RL and each list comprises a maximum number of hits. These lists must be scrolled sequentially in order to access the query hits. The illustrated result lists may each comprise a maximum number of hits which is greater than the result lists of DS1.

It may easily be understood that automatic access to the entities is very difficult for the different data sources for different reasons.

Hence, if the data source DS1 is queried by the retrieving profile and the resulting hits of the query exceed the maximum number of hits presentable in the result list, a complicated situation has arisen.

Moreover, data source DS2 comprises more or less chaotic information, and an intelligent method must be applied in order to establish and interpret the relevant information of the site.

The third data source DS3 looks a little like DS1 but differs significantly since the result list allows a greater number of hits in the result lists RL compared with that of the result list of DS1.

Moreover, the possible query entries of LQF3 differ from the possible query entries of LQF1.

In an exemplary embodiment, the data sources are accessed via a user query form UQF comprising a fill-in form suitable for all possible types and combinations of queries.

The illustrated user query form covers possible queries of local query forms and a further possible query fields addressing added information obtained by the predescribed classification.

A query type may e.g. be a car model, price, year, etc.

Typically, a certain minimum of information must be present at the web-site, such as price and car model. Such minimum criteria may be contained in the retrieving profile.

Turning now to FIG. 24e, a possible breakdown of a data source according to an embodiment of the invention will be described with reference to a binary query tree QT.

The illustrated method may be used for both total extraction from a data source or a direct user request.

The query tree QT illustrates how a local query form may be controlled to present a number of partial result lists representative of the total number of hits, and thus overcoming the problem of truncated result lists.

The illustrated example comprises a very simple data source, e.g. a web site offering second-hand cars.

The data source may be accessed through a query form having two possible query types; car model and year. The possible car models are Audi, BMW and Ford. The possible years are from 1980 to 2000.

According to a first entry, the data source is queried for an Audi: car model, CI, and within the possible years of 1980 to 2000.

The result of the initial query is 42 hits, but the present site truncates the result list to 20 hits, i.e. 20 cars.

Accordingly, the initial query is automatically divided into two child nodes, C1 & 1980-1989 and CI & 1990-2000. These queries should result in 29 and 3 hits respectively, i.e. too many hits in the first node.

Accordingly, the first node binary is divided into two queries CI & 1980-1984 and CI & 1985-1989. The number of results corresponding to each query is now 17 and 12, respectively.

Consequently, the initial query of CI & 1980-2000 has now been fractioned into three queries CI & 1980-1984, CI & 1985-1989 and CI & 1990-2000 providing the desired result in a result list having less than 20 true hits which are not truncated.

It should be noted that a complete query tree according to an embodiment of the invention may typically be stored in the retrieving profile once a data source has been accessed. Later, when the data source is accessed again, the data of the data source may be retrieved by means of the stored query combination. If, on the other hand, the contents of the data source have changed by removal or addition of entities, the stored query combination is no longer valid, and the query combination has to be recombined. This recombination is facilitated by storing the entire tree due to the fact that the query combination may be changed very quickly by means of a simple reconstruction of the query tree.

If, for instance, the above-mentioned node CI & 1980-1984 now contains a number of hits exceeding 20, the node may be divided into two child nodes, CI & 1980-1982; CI & 1983-1984, and the remaining queries of the query combination may be maintained.

If, on the other hand, the two query nodes CI & 1980-1984 and CI & 1985-1989 result in a number of hits 6 and 12 respectively, the two nodes should be aggregated into one node, i.e. the parent node, now having 18 hits instead of the original 29 hits. Accordingly, time required for the entity extraction of the site may be reduced.

An example of a way of establishing a robot suitable for information retrieval from the data sources DS1 and DS3 will now be described with reference to FIG. 6.

FIGS. 24a-24c illustrate access to a data source via a form according to one embodiment of the invention.

The example illustrated below shows a function which may be added to the robot of a data source accessible via a form.

According to the illustrated example, a data source of the nature mentioned above has been accessed. According to the illustrated embodiment, the retrieving profile RP has accessed a data source by means of an input query entry IQEI via a local query form LQF. The request has resulted in a number of result list entities RLE exceeding the maximum number of the result list MRL.

To reduce the number of hits, a further input query entry IQEI has been entered in FIG. 6b in order to narrow the query and to reduce the number of result list entities RLE. Still, the request has resulted in a number of result list entities RLE exceeding the maximum number of the result list MRL.

In FIG. 24c, the query has been further narrowed and the interval IQE3 has been further reduced. Consequently, the number of result list entities RLE is now less than the maximum number of the result list MRL.

The entities of the result list may now be analyzed and eventually copied to a database and entries corresponding to the obtained result stored in the retrieving profile RP.

Now, the difference between the result list entities RLE obtained in FIG. 6a and the result list entities RLE obtained in FIG. 24c is the complementary entries CRL.

This result list is obtained by entering a complementary input query CIQE3 as illustrated in FIG. 6d. According to the illustrated embodiment, the number of complementary result list entities CRLE is less than the maximum number result list. If not, the system should perform further iterations in order to divide the result list into a number of well-defined result lists.

The manner in which the subdivision of the result lists by performing query iterations as combinations of queries and query intervals in the input form takes place is stored in the retrieving profile RP for later use. Subsequent access to the data source will then be performed in steps according to the stored iteration. If a previous iteration stored in the retrieving profile is no longer effective due to changes in the number and types of entities in the data source, another iteration will be added to the retrieving profile RP in order to extract the desired entities.

An aspect of the invention is to search a number of web sites for a specific type of items, e.g. used cars for sale, at regular time intervals and to save the located information in a well-defined format in a central database. When a customer requests data on items corresponding to a certain set of search criteria, the data will be located in the database.

Each record (item) in the database has the same field, attributes, even though the data in the records may be collected from a number of different web sites. This increases the search opportunities, because the customer will be able to search a number of web sites simultaneously with the same search criteria (a single attribute or a set of attributes) that may not even be available on any of the web sites being searched.

Searching the web sites and saving data at regular time intervals provides an advantage compared with the normal strategy of real-time searching on customer request if one or more of the searched web sites are inaccessible at the time of the request. In the case of real-time searching, no data from the actual web site(s) will be available to the customer, whereas the latest collected data from the given web site(s) will still be available (although they are not brand new) when using a database. If a suitable time interval between searches has been chosen, the contents of the web sites being searched will not change dramatically from one search to the next.

What is claimed is:

1. A computer comprising:
   one or more central processing units, one or more memories and one or more network interfaces to one or more networks,
   the computer further comprising a program code which, when executed on said one or more central processing units, is configured to perform a search and a business transaction based on user input,
   a user interface comprising at least one display being configured to display in conjunction with execution of the program code,
   an input environment configured for user inputting of search criteria, said input environment being configured for user inputting of an order, said search criteria defining a search for at least one desired entity;
   the program code establishing a search engine configured for performing a search on at least two different web-based data sources to generate a search result;
   the search engine being configured to search based on the user input of a configuration comprising a combination of at least two different entities, a first entity and a second entity being includable in the at least two different entities that the search engine is configured to search,
   the search engine establishing a search for the configuration,
   wherein the different entities are purchasable from different web-based data sources,
   said search engine being configured for performing a search for said configuration on at least two different web-based data sources for said combination of entities,
   said search engine presenting at least one found configuration of the different entities by means of said user interface,
   said search engine being configured to provide at least one order input defining a configuration determined on the basis of said at least one found configuration presented by means of said user interface,
   said search engine being configured to take mutual dependencies between said entities into consideration.

2. The computer according to claim 1, wherein said mutual dependencies relates to appraising of said entities so that that a user may achieve the most cost efficient configuration of desired entities.

3. The computer according to claim 1, wherein said mutual dependencies comprises delivery costs to be added to the price of the selected entities to evaluate if a user may achieve the most cost efficient configuration of desired entities by taking delivery costs of the entities into consideration.

4. The computer according to claim 1, wherein said mutual dependencies comprises discount information to automatically evaluate if said user may achieve a cost efficient configuration of desired entities if the entities are bought from only one provider.

5. The computer according to claim 1, wherein said mutual dependencies comprises information of combinations of certain entities to facilitate increasing the user's opportunity to optimize the product configuration.

6. The computer according to claim 1, further comprising means for storing said search criteria; and means for automatically establishing subsequent searches based on the stored search criteria.

7. The computer according to claim 1, further comprising a configuration engine, said configuration engine comprising a graphical tool for establishing a search for at least two entities found at different data sources.

8. The computer according to claim 1, comprising a business transaction engine configured for initializing a business transaction based on the at least one order input.

9. The computer according to claim 1, wherein said search engine is configured for performing a search on the at least two different web-based data sources by means of a central database arrangement, said central database arrangement being configured for storing of the entities found during previous searches.

10. The computer according to claim 1, wherein said configuration comprising a combination of at least two different entities is a desired configuration comprising a combination of at least two different entities.

11. The computer according to claim 1, further comprising means for establishing a loan offer from at least one loan provider.

12. The computer according to claim 11, wherein said loan offer is established on a basis of at least one user-selected entity.

13. The computer according to claim 1, further comprising a shopping cart configured for storing possible orders, said shopping cart comprising means for selecting at least one of said stored possible orders, and submitting the selected order to an order manager with the purpose of initiating an order.

14. A method of establishing a transaction configured by at least one set of web based data sources, wherein at least two of said web based data sources are accessible via web-servers, and at least one set of entities comprises at least two entities accessible via different web-servers, the method comprising:
- establishing at least one query, said query comprising a configuration of one or more desired entities,
- searching in at least two of the web-servers for entities matching the configuration, said search comprising searching for a combination of at least two different entities, a first entity and a second entity being includable in the at least two different entities, and presenting at least one of the found set of entities to a user,
- the method being implemented on a computer,
- the computer comprising one or more central processing units, one or more memories and one or more network interfaces to one or more networks,
- the computer further comprising a search engine comprising program code which, when executed on said one or more central processing units performs a search on the basis of user inputted search criteria,
- a user interface comprising at least one monitor displaying in dependency of said program code,
- the different entities being entities which may be bought from different web-based data sources,
- said search engine being configured to performing a search for said configuration on at least two different web-bases data sources for said combination,
- said search engine presenting at least one found configuration of different entities by means of said user interface,
- said search engine taking mutual dependencies between said entities into consideration, and
- said search engine availing an order input defining a configuration determined on the basis of said at least one found configuration presented by means of said user interface.

15. The method according to claim 14, wherein said mutual dependencies relates to appraising of said entities so that that a user may achieve the most cost efficient configuration of desired entities.

16. The method according to claim 14, wherein said mutual dependencies comprises delivery costs to be added to the price of the selected entities to evaluate if a user may achieve the most cost efficient configuration of desired entities by taking delivery costs of the entities into consideration.

17. A system configured for searching for a combination of at least two different entities contained in web-based data sources,
- the system comprising a plurality of search engines established for extraction of data stored in at least two different web-based data sources, at least one of the search engines being implemented by means of at least one computer,
- the at least one computer comprising one or more central processing units, one or more memories and one or more network interfaces to one or more networks,
- the at least one computer further comprising a search engine comprising program code which, when executed on said one or more central processing units performs a search on the basis of user inputted search criteria,
- said search engine being configured for performing a search for a configuration of at least two different entities on at least two different web-bases data sources for said different entities,
- said configuration comprising a first entity and a second entity being includable in the at least two different entities that the system is configured to search for,
- said search engine presenting at least one found configuration of different entities by means of a user interface,
- said search engine availing an order input defining a configuration determined on the basis of said at least one found configurations presented by means of said user interface,
- said system taking mutual dependencies between said entities into consideration, and
- the user interface comprising at least one monitor displaying in dependency of said program code.

18. The system according to claim 17, wherein said mutual dependencies relates to appraising of said entities so that that a user may achieve the most cost efficient configuration of desired entities.

19. The system according to claim 17, wherein said mutual dependencies comprises delivery costs to be added to the price of the selected entities to evaluate if a user may achieve the most cost efficient configuration of desired entities by taking delivery costs of the entities into consideration.

* * * * *